(12) United States Patent
Matsuoka et al.

(10) Patent No.: US 9,501,739 B2
(45) Date of Patent: Nov. 22, 2016

(54) NEURON LEARNING TYPE INTEGRATED CIRCUIT DEVICE USING A PLURALITY OF SYNAPSES, A SOMA, TRANSISTORS, A ZENER DIODE, AND CONDENSERS

(71) Applicant: KABUSHIKI KAISHA TOSHIBA, Minato-ku, Tokyo (JP)

(72) Inventors: Yasuo Matsuoka, Kanagawa-ken (JP); Hiroshi Nomura, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 445 days.

(21) Appl. No.: 14/203,897

(22) Filed: Mar. 11, 2014

(65) Prior Publication Data
US 2015/0120629 A1 Apr. 30, 2015

Related U.S. Application Data

(60) Provisional application No. 61/898,120, filed on Oct. 31, 2013.

(51) Int. Cl.
*G06E 1/00* (2006.01)
*G06N 3/08* (2006.01)
*G06N 3/04* (2006.01)
*G06N 3/063* (2006.01)

(52) U.S. Cl.
CPC ...... *G06N 3/08* (2013.01); *G06N 3/04* (2013.01); *G06N 3/063* (2013.01)

(58) Field of Classification Search
USPC .......................................... 706/1, 12
See application file for complete search history.

(56) References Cited

U.S. PATENT DOCUMENTS

| | | | |
|---|---|---|---|
| 6,470,328 B1* | 10/2002 | Varshavsky | G06N 3/063 257/E27.06 |
| 2002/0030205 A1* | 3/2002 | Varshavsky | G06N 3/063 257/208 |

\* cited by examiner

*Primary Examiner* — David Vincent
(74) *Attorney, Agent, or Firm* — Finnegan, Henderson, Farabow, Garrett & Dunner LLP

(57) ABSTRACT

According to one embodiment, a neuron learning type integrated circuit device includes neuron cell units. Each of the neuron cell units includes synapse circuit units, and a soma circuit unit connected to the synapse circuit units. Each of the synapse circuit units includes a first transistor including a first terminal, a second terminal, and a first control terminal, a second transistor including a third terminal, a fourth terminal, and a second control terminal, a first condenser, one end of the first condenser being connected between the second and third terminals, and a control line connected to the first and second control terminals. The soma circuit unit includes a Zener diode including an input terminal and an output terminal, the input terminal being connected to the fourth terminal, and a second condenser, one end of the second condenser being connected between the fourth terminal and the input terminal.

15 Claims, 13 Drawing Sheets

NEURON LEARNING TYPE INTEGRATED CIRCUIT DEVICE USING A PLURALITY OF SYNAPSES, A SOMA, TRANSISTORS, A ZENER DIODE, AND CONDENSERS

CROSS-REFERENCE TO RELATED APPLICATIONS

This application is based upon and claims the benefit of priority from U.S. Provisional Patent Application 61/898,120, filed on Oct. 31, 2013; the entire contents of which are incorporated herein by reference.

FIELD

Embodiments described herein relate generally to a neuron learning type integrated circuit device.

BACKGROUND

The basis of neural networks is the model formula (Formula 1) proposed by Frank Rosenblatt in 1958 that shows the relationship between input signals $x_i$ and an output signal y of a neuron. In Formula 1, $W_i$ is the weight; $\theta$ is the threshold; and f(x) is the Heaviside step function. Also, f(x) is shown in Formula 2.

$$y = f\left(\sum_{i=1}^{n} W_i x_i - \theta\right) \quad \text{[Formula 1]}$$

$$f(x) = \begin{cases} 0 & (x \leq 0) \\ 1 & (x > 0) \end{cases} \quad \text{[Formula 2]}$$

When making a learning type neural network based on the model formulas, generally, a weight learning type model is used in which each of the weights $W_i$ are used as the effect variables of the learning.

BRIEF DESCRIPTION OF THE DRAWINGS

FIG. 3 is a drawing illustrating operations when the input signal x is ON;

DETAILED DESCRIPTION

Figure 1:
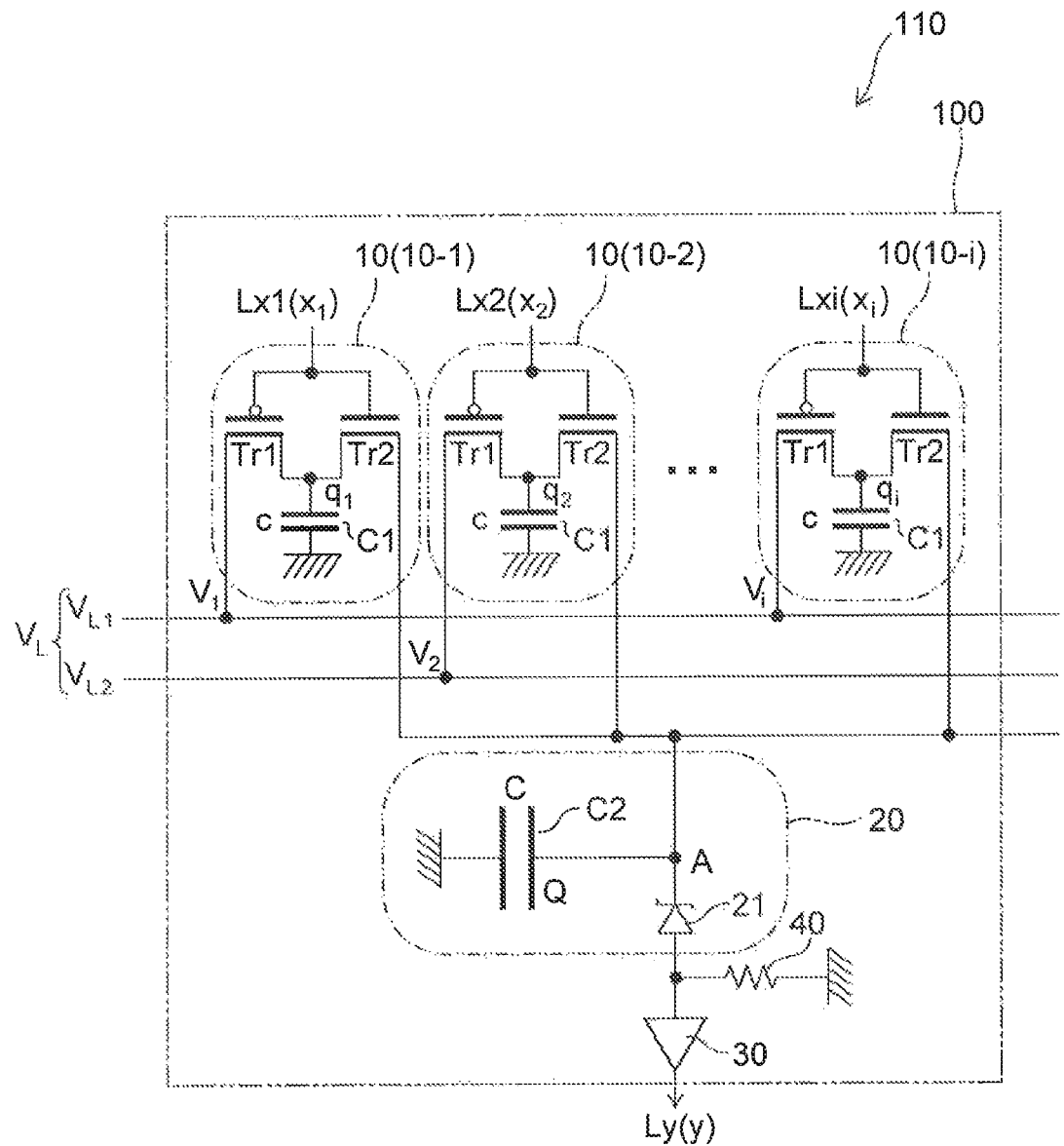
FIG. 1 is a circuit diagram illustrating a neuron learning type integrated circuit device according to a first embodiment.

According to one embodiment, a neuron learning type integrated circuit device includes a plurality of neuron cell units. Each of the plurality of neuron cell units includes a plurality of synapse circuit units, and a soma circuit unit connected to the plurality of synapse circuit units. Each of the plurality of synapse circuit units includes a first transistor including a first terminal, a second terminal, and a first control terminal, the first terminal being connected to one of a plurality of voltage lines, the first transistor being normally-on, a second transistor including a third terminal, a fourth terminal, and a second control terminal, the second terminal being connected to the third terminal, the second transistor being normally-off, a first condenser, one end of the first condenser being connected between the second terminal and the third terminal, and a control line connected to the first control terminal and the second control terminal. The soma circuit unit includes a Zener diode including an input terminal and an output terminal, the input terminal being connected to the fourth terminal, and a second condenser, one end of the second condenser being connected between the fourth terminal and the input terminal.

Various embodiments will be described hereinafter with reference to the accompanying drawings. In the description hereinbelow, the same members are marked with the same reference numerals; and a description is omitted as appropriate for members once described.

First Embodiment

FIG. 1 is a circuit diagram illustrating a neuron learning type integrated circuit device according to a first embodiment.

As shown in FIG. 1, the neuron learning type integrated circuit device 110 includes multiple neuron cell units 100. For convenience of description, one of the multiple neuron cell units 100 is shown in FIG. 1.

Each of the multiple neuron cell units 100 includes multiple synapse circuits 10 and a soma circuit 20.

In the example shown in FIG. 1, i synapse circuits 10 (i being a natural number) are provided. For the first to ith synapse circuits 10 of the embodiment, the first is called the synapse circuit 10-1, the second is called the synapse circuit 10-2, ..., and the ith is called the synapse circuit 10-i. Also, the synapse circuits 10-1, 10-2, and 10-i are generally referred to as the synapse circuit 10.

Each of the multiple synapse circuits 10 includes a first transistor Tr1, a second transistor Tr2, and a first condenser C1. The first transistor Tr1 is normally-on. The second transistor Tr2 is normally-off. A CMOS transistor (Complementary Metal Oxide Semiconductor Field Effect Transistor) includes the first transistor Tr1 and the second transistor Tr2.

The first transistor Tr1 includes a first terminal T1 connected to the source, a second terminal T2 connected to the drain, and a first control terminal G1 connected to the gate. The second transistor Tr2 includes a third terminal T3 connected to the source, a fourth terminal T4 connected to the drain, and a second control terminal G2 connected to the gate.

The first terminal T1 of the first transistor Tr1 is connected to one of multiple voltage lines $V_L$. Two voltage lines $V_{L1}$ and $V_{L2}$ are provided in the example shown in FIG. 1. In the example shown in FIG. 1, the first terminal T1 of the first synapse circuit 10-1 is connected to the voltage line $V_{L1}$; and the first terminal T1 of the second synapse circuit 10-2 is connected to the voltage line $V_{L2}$. Also, the first terminal T1 of the ith synapse circuit 10-i is connected to the voltage line $V_{L1}$. Which of the voltage lines $V_{L1}$ or $V_{L2}$ is connected to the first terminal T1 of each of the synapse circuits 10 is determined by the layout of the interconnect pattern.

The second terminal T2 of the first transistor Tr1 is connected to the third terminal T3 of the second transistor Tr2. In other words, the third terminal T3 of the second transistor Tr2 is connected to the second terminal T2 of the first transistor Tr1.

One end of the first condenser C1 is connected between the second terminal T2 and the third terminal T3. The other end of the first condenser C1 is, for example, grounded.

The soma circuit 20 includes a Zener diode 21 and a second condenser C2. The Zener diode 21 includes an input terminal 21a and an output terminal 21b. The input terminal 21a is connected to the fourth terminal T4 of each of the synapse circuits 10.

One end of the second condenser C2 is connected between the fourth terminals T4 and the input terminal 21a. The other end of the second condenser C2 is, for example, grounded.

The output terminal 21b of the Zener diode 21 may be connected to an amplifier circuit 30. One end of a load resistance 40 may be connected between the output terminal 21b and the input terminal of the amplifier circuit 30.

In each of the synapse circuits 10, a signal is input from an input line $L_x$ to the first control terminal G1 of the first transistor Tr1 and the second control terminal G2 of the second transistor Tr2. The input line that is connected to the first synapse circuit 10-1 is the input line $L_{x1}$; the input line that is connected to the second synapse circuit 10-2 is the input line $L_{x2}$; . . . ; and the input line that is connected to the ith synapse circuit 10-i is the input line $L_{xi}$. In the embodiment, the input lines $L_{x1}$, $L_{x2}$, . . . , and $L_{xi}$ are generally referred to as the input line $L_x$.

The output terminal 21b of the Zener diode 21 of the soma circuit 20 is connected to an output line $L_y$. In the case where the amplifier circuit 30 is provided, the output of the amplifier circuit 30 is connected to the output line $L_y$.

For the multiple neuron cell units 100, the output line $L_y$ included in one of the neuron cell units 100 (a first neuron cell unit) is connected to one of the multiple input lines $L_x$ included in one other of the neuron cell units 100 (a second neuron cell unit). Such connections of the multiple neuron cell units 100 are performed two-dimensionally and three-dimensionally.

Each of the multiple neuron cell units 100 is an electronic circuit that is equivalent to a threshold learning type neuron model. The neuron model is shown in Formula 1 and Formula 2. In Formula 1, $x_i$ corresponds to the signal of the input line $L_x$ of the neuron cell unit 100 shown in FIG. 1; and y of Formula 1 corresponds to the output signal output via the output line $L_y$ of the neuron cell unit 100 shown in FIG. 1. The output value of the threshold learning type neuron model changes due to θ of Formula 1.

The circuit shown in FIG. 1 is shown in the following Formula 3.

$$y = f\left(\frac{c\sum V_i x_i + Q}{c\sum x_i + C} - V_Z\right) \quad \text{[Formula 3]}$$

$$= f\left(\frac{c\sum V_i x_i + Q - cV_Z \sum x_i - CV_Z}{c\sum x_i + C}\right)$$

$$= f\left(\frac{c\sum(V_i - V_Z)x_i - CV_Z + Q}{c\sum x_i + C}\right)$$

$$= f\left(\frac{\sum W_i x_i - \theta}{c\sum x_i + C}\right)$$

In Formula 3, "c" is the capacitance of the first condenser C1; "C" is the capacitance of the second condenser C2; "V" is the voltage applied to the voltage line VL; "Q" is the charge of the second condenser C2; and "$V_z$" is the Zener voltage (the breakdown voltage) of the Zener diode 21.

Here, the weight $W_i$ is taken to be $W_i=c(V_i-V_z)$; and the threshold θ is taken to be $\theta=CV_z-Q$. Further, $c\Sigma x_i+C>0$ holds to satisfy Formula 2. Accordingly, Formula 3 is modified to become Formula 1.

As recited above, the neuron cell unit 100 shown in FIG. 1 is a circuit equivalent to Formula 1. In other words, the level of the output signal y of the neuron cell unit 100 is determined according to the difference ($CV_z-Q$) between the total charge amount ($CV_z$) storable in the second condenser C2 and the amount of charge Q stored in the second condenser C2. Here, $CV_z-Q$ is the threshold θ of Formula 1. If the capacitance C of the second condenser C2 and the Zener voltage (the breakdown voltage) $V_z$ of the Zener diode 21 are constant, the level of the output signal y of the neuron cell unit 100 is determined by the amount of charge Q of the second condenser C2. That is, if the amount of charge Q of the second condenser C2 is determined by learning, a neuron model (a threshold learning type neuron model) is configured in which the threshold θ of Formula 1 changes by learning.

Operations of the neuron cell unit 100 shown in FIG. 1 will now be described.

Figure 2:
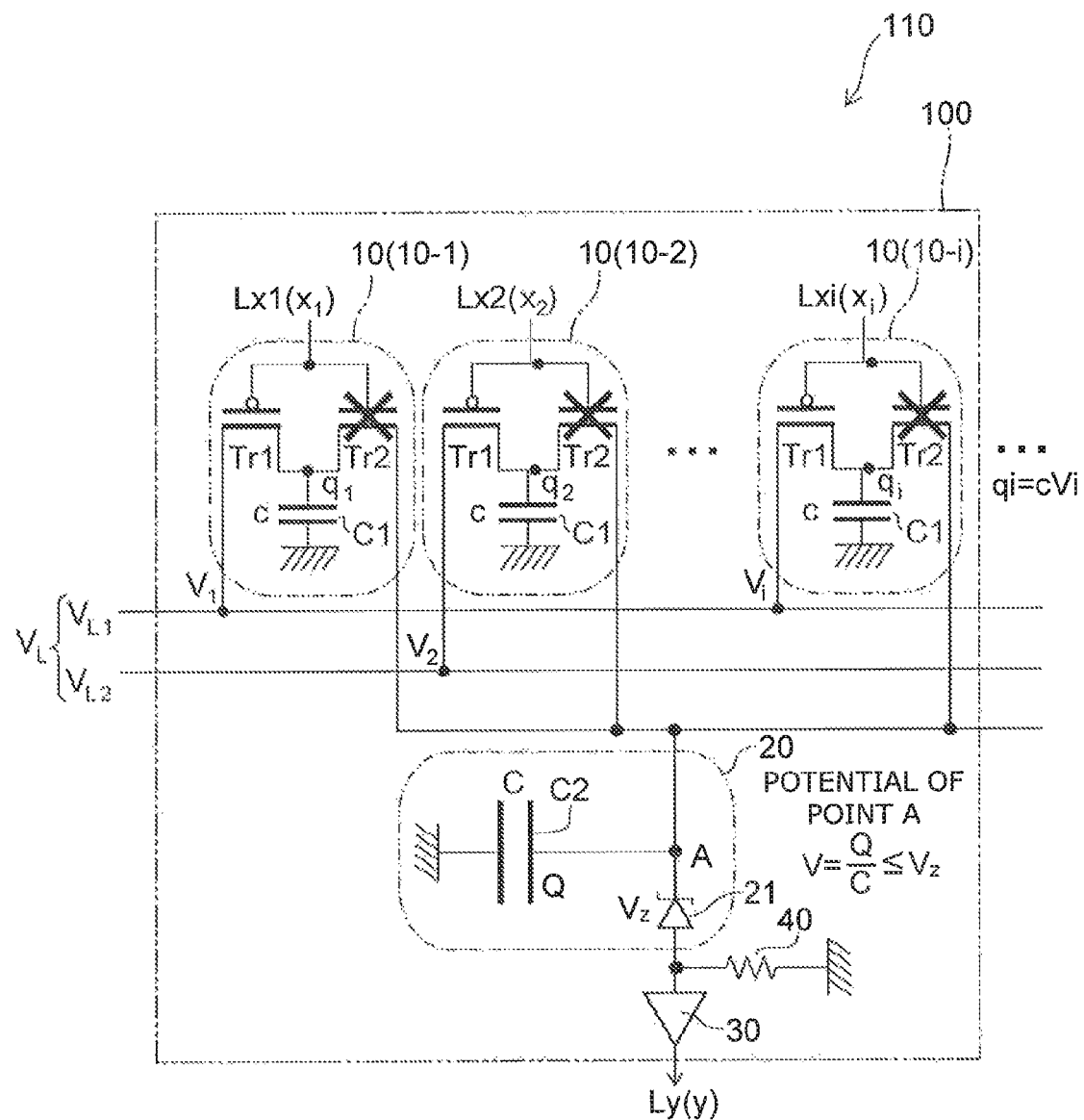
FIG. 2 is a drawing illustrating operations when the input signal x is OFF.

FIG. 2 is a drawing illustrating operations when the input signal x is OFF.

Figure 3:
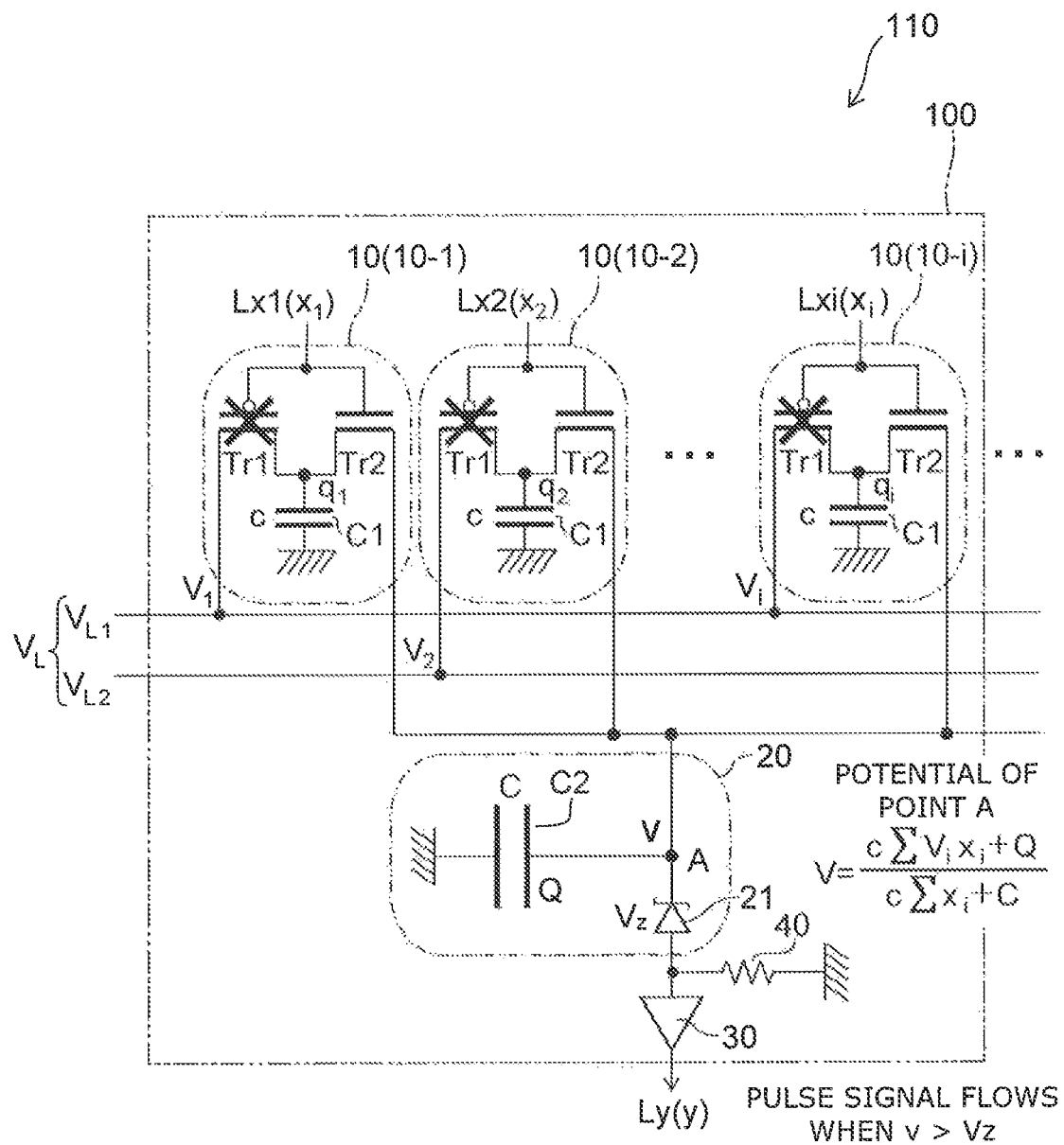

FIG. 3 is a drawing illustrating operations when the input signal x is ON.

First, in the case where the input signal x is OFF as shown in FIG. 2, the first transistor Tr1 of each of the synapse circuits 10 is in the on-state; and the second transistor Tr2 of each of the synapse circuits 10 is in the off-state. Thereby, charge is stored in the first condenser C1 of each of the synapse circuits 10. At this time, the potential v at a connection point A between the input terminal 21a of the Zener diode 21 and the one end of the second condenser C2 is v=Q/C. In the case where the potential v is not more than the Zener voltage (the breakdown voltage) $V_z$ of the Zener diode 21, the output signal y is OFF.

Then, in the case where the input signal x is ON as shown in FIG. 3, the first transistor Tr1 of each of the synapse circuits 10 is switched to the off-state; and the second transistor Tr2 of each of the synapse circuits 10 is switched to the on-state. Thereby, the charge that is stored in the first condenser C1 of each of the synapse circuits 10 is discharged. At this time, the potential v at the connection point A between the input terminal 21a of the Zener diode 21 and the one end of the second condenser C2 is $v=(c\Sigma V_i x_i+Q)/(c\Sigma x_i+C)$. Then, when the potential v is greater than the Zener voltage (the breakdown voltage) $V_z$ of the Zener diode 21, the output signal y is switched ON.

A delay circuit unit may be provided in each of the synapse circuits 10. In the operations recited above, the delay circuit unit sets the time of the first transistor Tr1 and the second transistor Tr2 being simultaneously OFF when switching the input signal x ON and OFF.

Figure 4A:
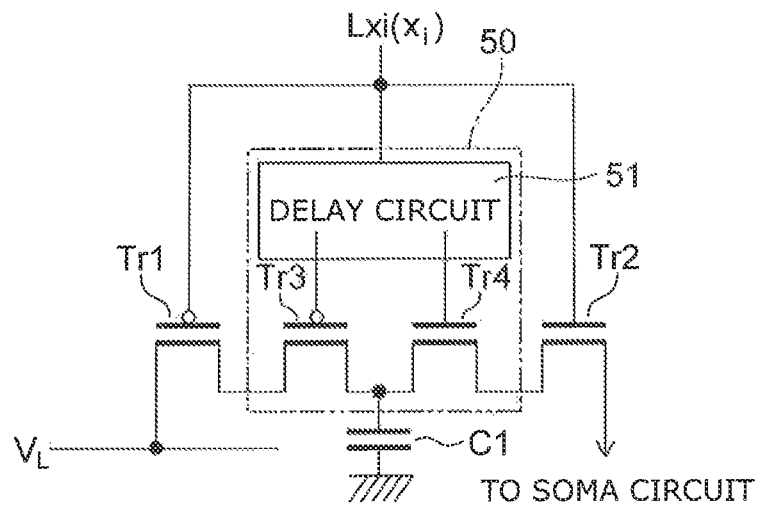
FIG. 4A and FIG. 4B are drawings illustrating delay circuit units.
Figure 4B:
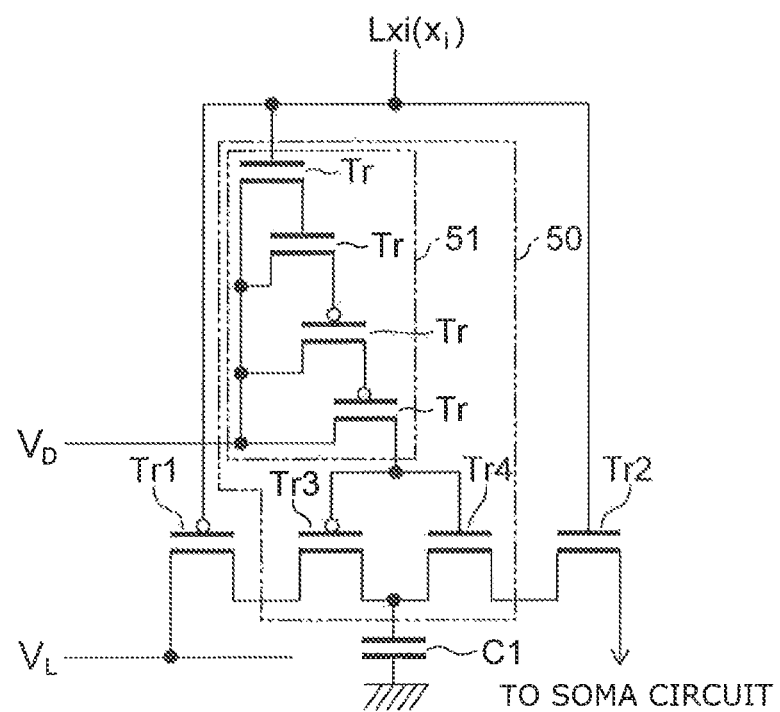

FIG. 4A and FIG. 4B are drawings illustrating delay circuit units.

As shown in FIG. 4A, a delay circuit unit 50 is provided between the second terminal T2 and the third terminal T3. As an example, the delay circuit unit 50 includes a delay circuit 51, a third transistor Tr3, and a fourth transistor Tr4.

The third transistor Tr3 is normally-on. The third transistor Tr3 is connected in series with the first transistor Tr1. The fourth transistor Tr4 is normally-off. The fourth transistor Tr4 is connected in series with the second transistor Tr2. The fourth transistor Tr4 is connected in series with the third transistor Tr3. The delay circuit 51 is provided between the input line $L_{xi}$ and the gate of the third transistor Tr3 and between the input line $L_{xi}$ and the gate of the fourth transistor Tr4.

As shown in FIG. 4B, as an example, the delay circuit 51 includes four transistors 51a, 51b, 51c, and 51d. The transistors 51a and 51b are normally-off. The transistors 51c and 51d are normally-on.

The sources of the four transistors 51a, 51b, 51c, and 51d are connected to a voltage line $V_D$. The gate of the transistor 51a is connected to the input line $L_{xi}$. The drain of the transistor 51a is connected to the gate of the transistor 51b. The drain of the transistor 51b is connected to the gate of the transistor 51c. The drain of the transistor 51c is connected to the gate of the transistor 51d. The drain of the transistor 51d is connected to the gates of the third transistor Tr3 and the fourth transistor Tr4.

By providing such a delay circuit unit 50, there is no longer a timing when the first transistor Tr1, the second transistor Tr2, the third transistor Tr3, and the fourth transistor Tr4 all are ON simultaneously when switching the input signal $x_i$ ON and OFF. Thereby, the storing of the charge in the first condenser C1 and the discharging of the charge from the first condenser C1 are performed distinctly.

The neuron learning type integrated circuit device 110 according to the embodiment includes a plurality of the neuron cell units 100 such as those recited above. The multiple neuron cell units 100 are connected two-dimensionally and three-dimensionally. In the embodiment, one neuron cell unit 100 is taken to be the smallest unit. An aggregate of the multiple neuron cell units 100 is a neuron group. An aggregate of multiple neuron groups is a neuron block. An aggregate in which multiple neuron blocks are disposed in multiple layers is a neuron column.

The multiple synapse circuits 10 are connected in the neuron cell unit 100. Among the multiple neuron cell units 100, several of the neuron cell units 100 have logic circuit functions.

Here, the neuron cell units 100 of each level disposed inside a neuron column are configured in a complex network. The neuron learning type integrated circuit device 110 is configured in a state in which a large amount of neuron columns are orderly arranged on the chip.

In the disposition of the neuron columns on the chip, the neuron columns are connected to each other by a neural network based on an interconnect list (a first interconnect list). The initial interconnect structure is determined by the first interconnect list. Also, in the neuron learning type integrated circuit device 110, it is possible to freely modify the neural network by correcting the first interconnect list.

Also, the electrical connections between the multiple neuron cell units 100 change dynamically by learning. Also, the connections themselves between the multiple neuron cell units 100 change dynamically due to interactions. Thereby, one neuron column has a function that is equivalent to that of a small computer as if a circuit that is equivalent to the structural function of the human brain is realized.

By using the neuron cell unit 100 as the basic unit, for example, a multiple hierarchical structure resembling the structure of the neurons of a human of which the cerebral cortex is representative is easily realizable as the basic structure of the neuron column. For example, generally, it is said that the human brain includes a cerebral cortex of 6 layers. Thereby, it is possible for 52 brain functions that are considered to be the functional structure of the human brain to work by being allocated. Further, the interconnects that transmit the information output from the neuron column as input information to another neuron column also are defined by an interconnect list (a second interconnect list).

Within the meaning of "learning type," the neuron learning type integrated circuit device 110 may include multiple types of neuron columns. For example, a series of processing may be subdivided and subjected to simultaneous parallel processing by arbitrarily selected multiple neuron columns. Also, a measure of the certainty based on the entire processing result of the parallel processing may be included; and the final aggregate may have the judgment, identification, and discrimination functions for determining the optimal true value.

When performing these functions, learning for the error in the case where the true value is not reached may be performed; and there may be feedforward and feedback functions to approach the value that is used as a sample. These equivalent circuits of learning type neuron circuits and logical operation functions may be appropriately arranged; and the interconnect connections which are the core between the equivalent circuits may be connected by the first and second interconnect lists described above. Thereby, a hybrid learning type semiconductor integrated circuit device that is pre-made in the hardware is realized.

The aggregate of the neuron cell units 100 included in the neuron column can perform learning of the result of the information processing. Also, it is possible to output the initial value of the neuron network of a point in time (for example, the intelligence of a 3-year old child) cultivated by simulation and/or learning to determine the optimal solution as the stream data of a FPGA (Field Programmable Gate Array). Thereby, for example, the intelligence of the 3-year old child that is cultivated by the neuron column can be reproduced by the FPGA by artificially copying the processing.

Further, as a peripheral function, the clock frequencies and/or the voltages that operate may be different between the neuron columns. Also, the operation frequencies may resonate and be enhanced between the neuron columns; and a logic circuit may be disposed to strengthen the connections between the neuron columns. Also, operations may be performed by switching the operating voltages between the neuron cell units 100 that are in blocks. Further, the functions of switching devices for power saving may be provided.

Thus, the neuron learning type integrated circuit device 110 according to the embodiment has functions such as those of the brain of a human who grows while repeating self-learning. The neuron learning type integrated circuit device 110 is an extensible semiconductor integrated circuit device that realizes a huge neural network having the object of intelligent information control.

Based on neurobiological knowledge, the neuron learning type integrated circuit device 110 provides a semiconductor integrated circuit device that manages the control of various operation/discrimination functions, memory learning functions, communication functions, etc., with a nucleus of a "neuron column" that imitates the structure of the brain made of neurons (neurons) and synapses which are one type of switch that connects the neurons.

The multiple synapse circuits 10 that are equivalent to the circuits of the nervous system of a human are provided in one neuron cell unit 100. The neuron cell unit 100 is an equivalent circuit of a threshold learning type neuron model. Further, a portion of the neuron cell unit 100 is configured in a hybrid type neural network that includes not only logical operation/discrimination functions but also a series of control functions of machine readable/programmable pattern memory functions, etc.

The neuron learning type integrated circuit device 110 operates without preparing a program beforehand. Moreover, functions are realized that are equivalent to those of the brain of executing distributed processing and parallel processing. Further, the neuron learning type integrated circuit device 110 includes simple application functions such as pattern recognition, associative memory, classification, etc.

Further, a hierarchical multilayered network may be configured based on the second interconnect list to employ the network structure also between the multiple neuron columns. Thereby, as an entirety, a huge neuron network that imitates the nervous system of a human is realized. For example, a hybrid learning type neuron learning type integrated circuit device 110 is realized that includes various judgment and identification functions such as executing high-speed logical operation functions in some portions.

Here, in the case where a learning type neural network is made, generally, a weight learning type model is used in which each of the weights $W_i$ are used as the effect variables of the learning. In the case where a learning type neural network is to be realized using an LSI, one synapse circuit must have a register circuit for storing the numerical value of the weight $W_i$. Also, an adder is necessary in the soma circuit that connects the multiple synapse circuits; and the entire neuron circuit becomes extremely complex. As a result, at most about several hundred neuron circuits can be embedded inside one LSI; and for synapse circuits as well, about several thousand can be included inside the one LSI.

For example, the capacity of a DRAM manufactured using a design rule having a minimum line width of 0.25 micrometers (µm) is about 256 megabytes (MB); and 1 element includes one transistor and one capacitor. In the case where a neuron LSI is to be manufactured using this design rule, not more than 17 transistors can be allotted to one neuron cell made of about 10 synapse circuits and one soma circuit. On the other hand, it is theoretically possible to allot 1100 transistors similarly for a design rule having a minimum line width of 0.1 µm.

However, in an actual LSI, much surface area is necessary for the network interconnects. Even inside the cerebral cortex of a human, there are clumps of neurons having various functions. According to one theory, the cerebrum is divided into 52 functions or parts; the functions and workings of each are different; and furthermore, it is becoming known that each works not independently but while seeking interactions and appropriately cooperating to achieve the object and perform complex processing while affecting.

In the actual cerebrum, such complex network interconnects that exceed the frameworks of the columns occupy not less than 90% of the volume. Of course, the interconnect units inside a neuron LSI in which the neuron circuits are disposed in a plane also are predicted to be correspondingly large; and as a result, the likelihood is high that the surface area allotted to the neuron circuit units will be about half of the entirety or less.

Up to now, it is known that a band of 2 millimeters (mm) of the human brain is the cerebral cortex, and the rest corresponds to the interconnect units. It is said that neuron divisions cease after about 18 times. It is also said that the volume of the brain is about 1350 cc and there are about 14 billion (14 giga) neurons. Among the neurons, it is said that proper arrangements are determined for the cerebral cortex; and scientifically, these are called columns.

Also, if there are about 1000 neurons inside one column and about 1000 synapses for every neuron, the number of LSIs that can be packed inside an equivalent volume is unfortunately at most about 1000.

In the case where the brain of an autonomous large-scale robot is to be made using about 1000 realistic LSIs, about 14 million (14 mega (M)) neuron cells must be embedded in one LSI. In other words, the higher integration that is necessary is about 20,000 times that of neuron LSIs that are currently realized. Such a level cannot possibly be reached by downscaling LSIs.

Thus, even an integrated circuit of 1 kilo (K) is difficult to realize using a neuron LSI conforming to the conventional model formula. Furthermore, it must be said that a neuron LSI of the several-M level is impossible.

Figure 5:
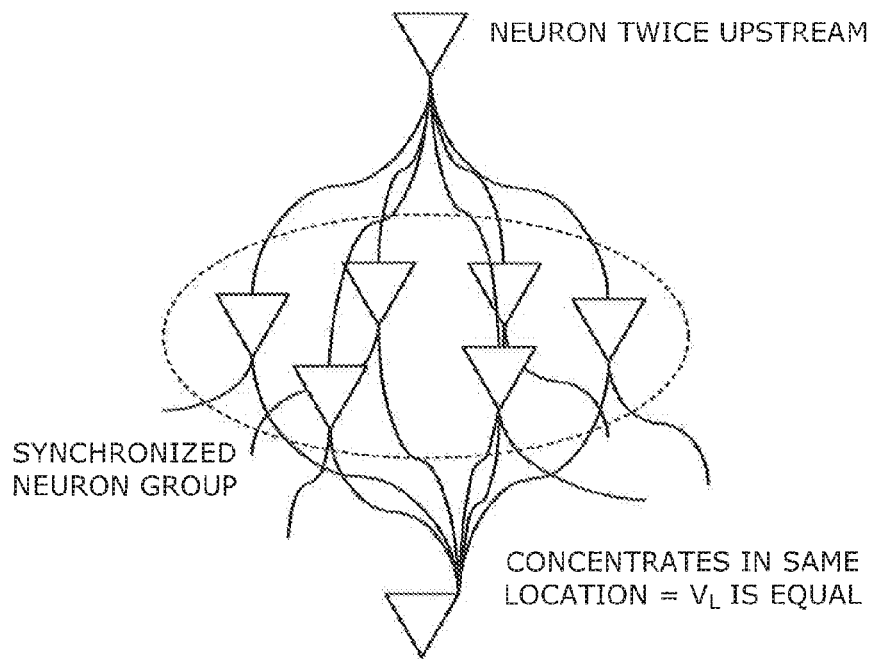
FIG. 5 is a schematic view illustrating a neuron structure.

FIG. 5 is a schematic view illustrating a neuron structure.

There are reports such as an experimental report according to an article published in "Science" of January 2012 that "synchronized inputs concentrate in one location on the dendrite" and reports that for an actual neuron network, synapses increase abruptly directly after the birth of an animal but then gradually are broken and disappear to subsequently settle to a constant amount. It is considered that such reports illustrate characteristics of the neuron network that is formed.

Also, because the position on the dendrite where the synapse is connected is strongly related to the weight, it is considered that synchronized inputs have substantially the same weight. Also, from the knowledge that "proximal spines within 8 µm have synchronous activity significantly more easily," it is considered that most are at narrow spatially-concentrated regions where the connections are strong and "cluster input" occurs.

Also, because the same input can be confirmed not only for hippocampal slice culture samples but also for the cerebral cortex inside organisms, there is knowledge that this is not a special phenomenon only in the hippocampus but is a phenomenon that is widely observed in multiple parts of the brain.

From this knowledge as well, it is considered that it is desirable for the basic configuration of the entire neural network to be such that the connections between the neuron cells are in a state of being able to be largely divided into the two models of the cluster model and the dispersion model and connected as necessary. Close to this way of thinking, there is now knowledge that it is necessary to have a connection to the same neuron once upstream as shown in FIG. 5 for the inputs to be synchronized.

Further, although it is said that thinking changes due to the physical condition in the case of a human, it is problematic that, for a neuron equivalent circuit in which the equivalent circuit also has behavior similar to changes of the manic/depressive potential, in the state of the art, the circuit itself is complex and is not realistic in most cases. Therefore, this is a large barrier when making an actual LSI; and in the state of the art, such an actual LSI has not been realized.

Figure 6:
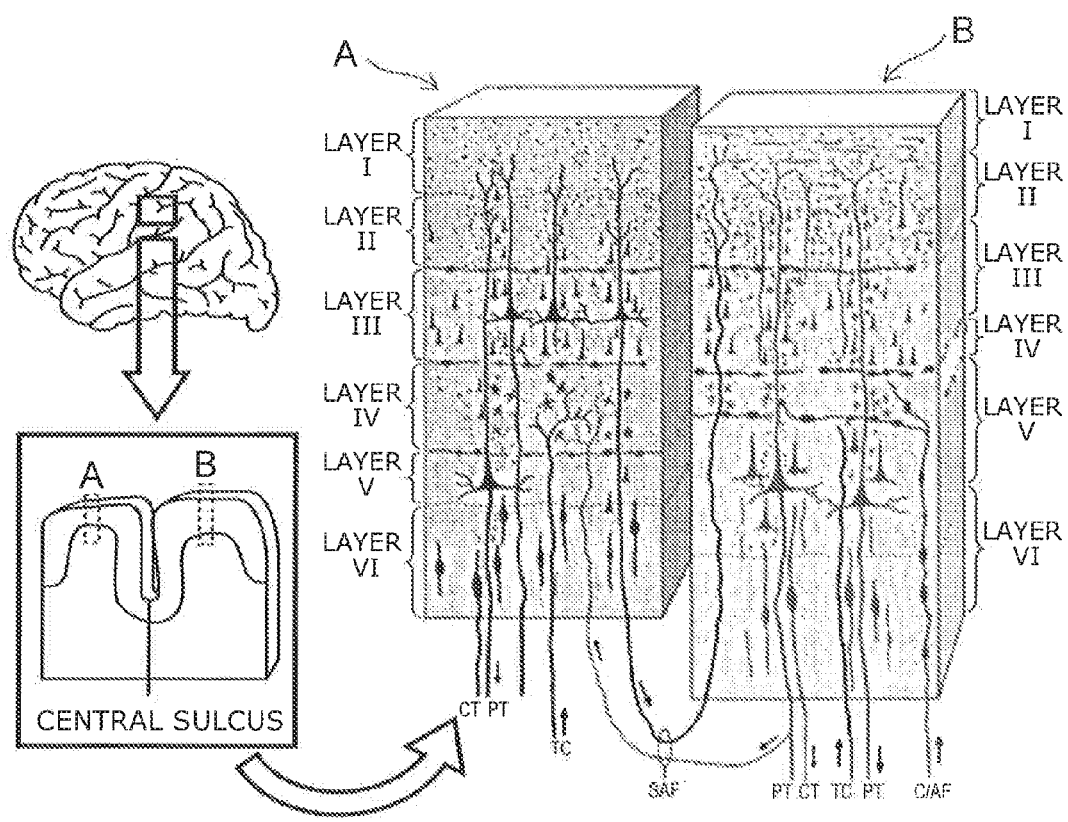
FIG. 6 is a schematic view illustrating the layer structure of the cerebral cortex.

In recent research reports, the basic structure has become clear between the thalamus and the two areas of the sensory area and the motor area of the cerebral cortex which each have a 6-layer structure. FIG. 6 is a schematic view illustrating the layer structure of the cerebral cortex.

Here, this is conjectured based on the connections by the cortical fibers between the cerebral cortex and the thalamus (shishou) that performs the important role of relaying the sensory input of vision, hearing, the somatic senses, etc., other than smell particularly to the cerebral neocortex.

First, the sensory input signals that enter from the thalamus mainly enter (are connected to) layer IV of the sensory area where some processing is performed and subsequently are transmitted (connected) to layer III. Subsequently, these are connected to the cortical fibers between layers V and VI through layer II of the motor area side. Further, here, some processing is performed. The cortical fibers go toward layers V and VI of the motor area. Therefore, it is considered that ultimately layers V and VI receive the result of a series of processing and supervise the output.

Although all of the details of the neurons of the brain are thus being elucidated little by little in daily research, currently there is almost no understanding in the sense of the clear roles and correlations between each part and how the optimal structure of the neurons (the neurons) should be for the clear roles and correlations.

For the threshold learning type neuron learning type integrated circuit device 110 according to the embodiment, a colossal neural network of the level of several mega to several tens of mega can be configured in 1 chip by a simple configuration having CMOS transistors at the center. In other words, an electronic circuit that is equivalent to a threshold learning type neuron model can be realized using a simple circuit configuration; and simultaneously, a super large-scale threshold learning type neural network can be realized in which, for example, not less than a million neuron cells are integrated.

Figure 7A:
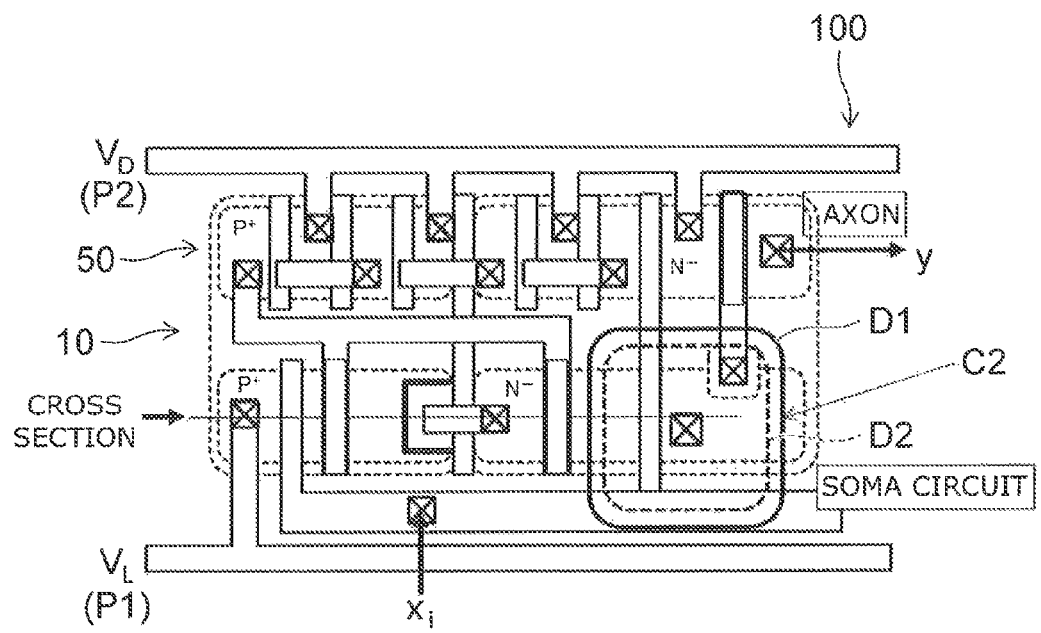
FIG. 7A and FIG. 7B are drawings illustrating the structure of a neuron cell unit.
Figure 7B:
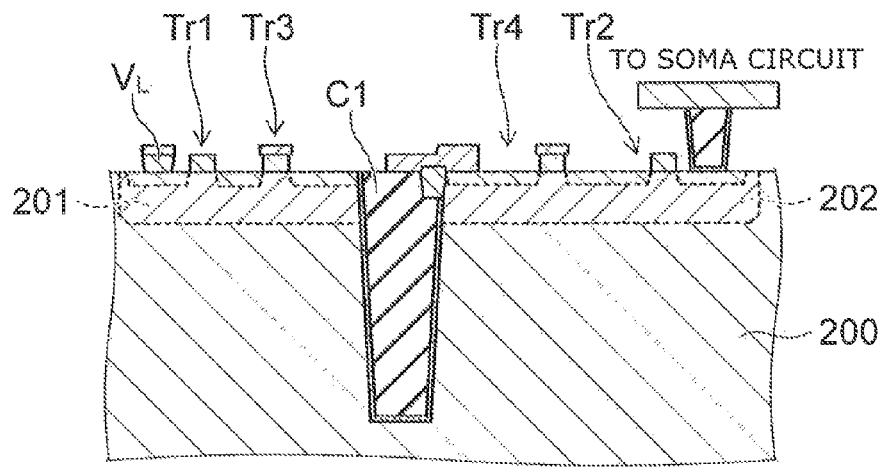

FIG. 7A and FIG. 7B are drawings illustrating the structure of a neuron cell unit.

The planar structure of the neuron cell unit 100 is shown in FIG. 7A. The cross-sectional structure of the neuron cell unit 100 illustrated by line A-A of FIG. 7A is shown in FIG. 7B. The structure of one synapse circuit 10 included in the neuron cell unit 100 is shown in FIG. 7A and FIG. 7B. The delay circuit unit 50 is included in the one synapse circuit 10.

The neuron cell unit 100 is provided in a semiconductor substrate 200 of silicon or the like. An n-type well region 201 and a p-type well region 202 are provided in the semiconductor substrate 200. The p-type well region 202 is arranged with the n-type well region 201. Normally-on transistors (the first transistor Tr1, the third transistor Tr3, and the transistors 51c and 51d) are provided in the n-type well region 201. Normally-off transistors (the second transistor Tr2, the fourth transistor Tr4, and the transistors 51a and 51b) are provided in the p-type well region 202.

The first condenser C1 is provided between the n-type well region 201 and the p-type well region 202. The first condenser C1 has, for example, a trench structure. The power supply line VL is connected to the source of the first transistor Tr1 as an interconnect pattern P1. The power supply line VD is connected to the sources of the transistors 51a, 51b, 51c, and 51d as an interconnect pattern P2.

The drain of the second transistor Tr2 is connected to the not-shown soma circuit unit 20. The second condenser C2 of the soma circuit unit 20 is a planar capacitor. The second condenser C2 includes a first plate electrode D1 and a second plate electrode D2. The second plate electrode D2 is disposed with an insulating layer (not shown) interposed on a first layer in which the first transistor Tr1, the second transistor Tr2, the third transistor Tr3, and the fourth transistor Tr4 are provided. The first plate electrode D1 is disposed on the second plate electrode D2 with the insulating layer (not shown) interposed.

Figure 8:
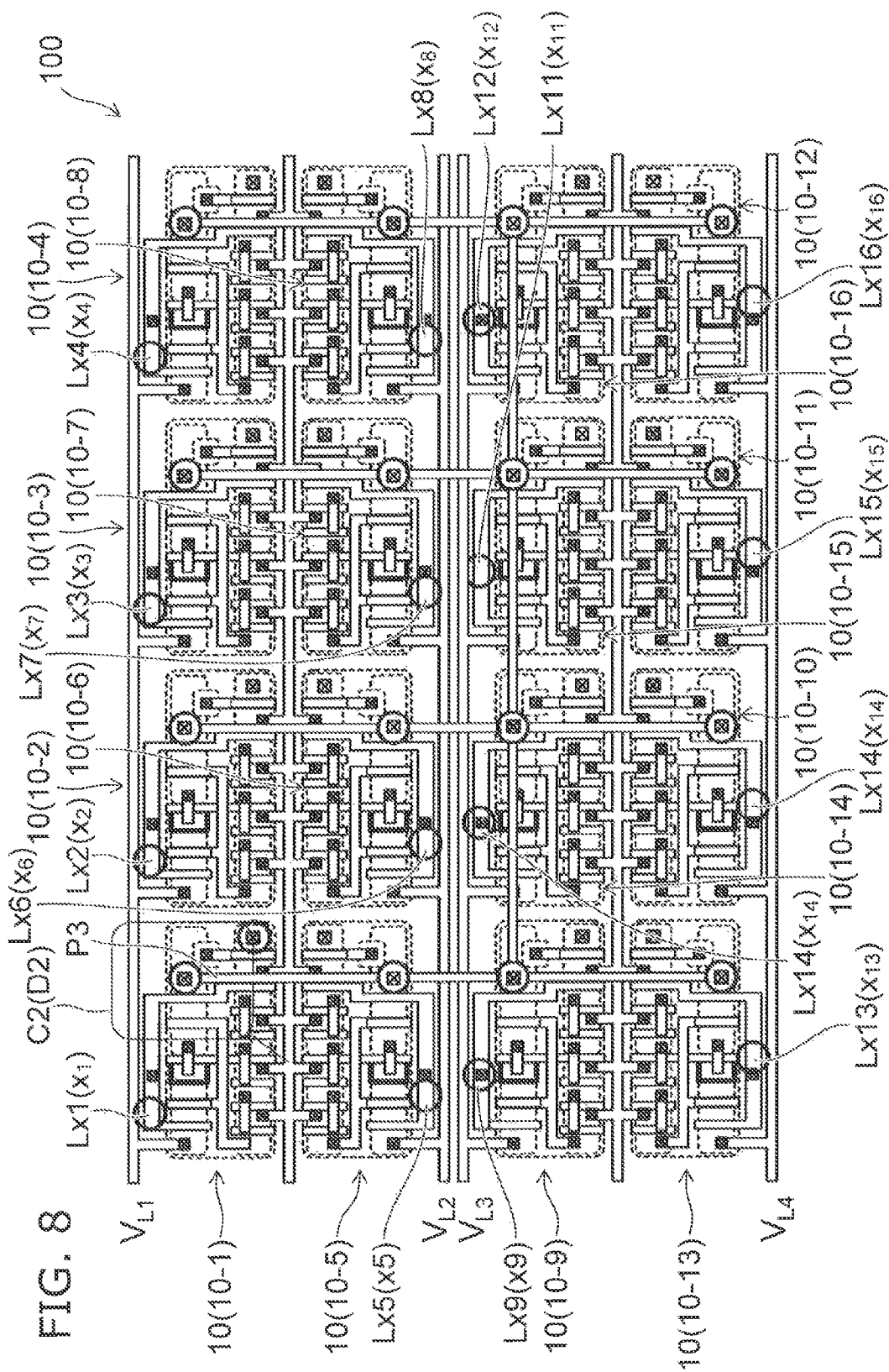
FIG. 8 is a schematic plan view illustrating the layout of multiple neuron cell units.

FIG. 8 is a schematic plan view illustrating the layout of multiple synapse circuits.

An example of the layout of 16 synapse circuits 10 is shown in the example shown in FIG. 8. In the example, 4 by 4 synapse circuits 10 are disposed. The input lines Lx1, Lx2, Lx3, and Lx4 are connected to the power supply line VL1. The input lines Lx5, Lx6, Lx7, and Lx8 are connected to the power supply line VL2. The input lines Lx9, Lx10, Lx11, and Lx12 are connected to a power supply line VL3. The input lines Lx13, Lx14, Lx15, and Lx16 are connected to a power supply line VL4. The connectional relationships between the input lines $L_x$ and the power supply lines VL1 to VL4 are set according to the interconnect pattern and therefore are not necessarily limited to the example recited above.

Also, in the layout shown in FIG. 8, the drains of the second transistors Tr2 of the synapse circuits 10 are connected by an interconnect pattern P3. The interconnect pattern P3 is connected to the soma circuit unit 20. The interconnect pattern P3 is connected to the second plate electrode D2 of the second condenser C2.

Thus, because the neuron learning type integrated circuit device 110 according to the embodiment is formed on the semiconductor substrate 200, the neuron learning type integrated circuit device 110 according to the embodiment is formed easily by normal methods for manufacturing CMOS transistors. Also, various neural networks can be made by the layout of the interconnect patterns P1, P2, and P3.

Second Embodiment

Figure 9:
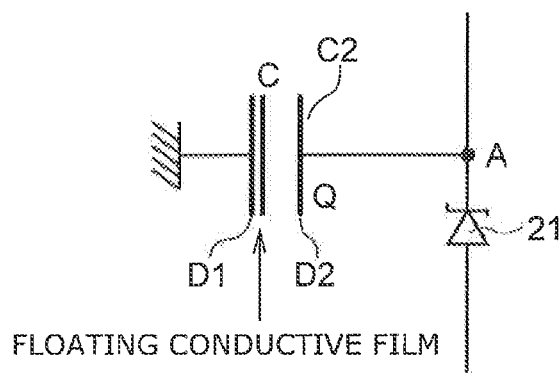
FIG. 9 is a circuit diagram illustrating a portion of a neuron learning type integrated circuit device according to a second embodiment.

FIG. 9 is a circuit diagram illustrating a portion of a neuron learning type integrated circuit device according to a second embodiment.

The circuit diagram of the second condenser C2 is shown in FIG. 9. In the neuron learning type integrated circuit device according to the second embodiment, the second condenser C2 includes a floating conductive film D3. The floating conductive film D3 is provided between the first plate electrode D1 and the second plate electrode D2.

An insulating film that is thin enough for a tunneling current to flow is provided between the floating conductive film D3 and the second plate electrode D2. In the second condenser C2 that includes the floating conductive film D3, when a strong signal is input to the one end (the connection point A) of the second condenser C2, the tunneling current flows; and charge gradually is stored in the floating conductive film D3. When the charge is stored in the floating conductive film D3, the memory in the neuron cell unit 100 becomes more long-term. In other words, the long-term enhancement coefficient of the neuron cell unit 100 increases.

Third Embodiment

Figure 10A:
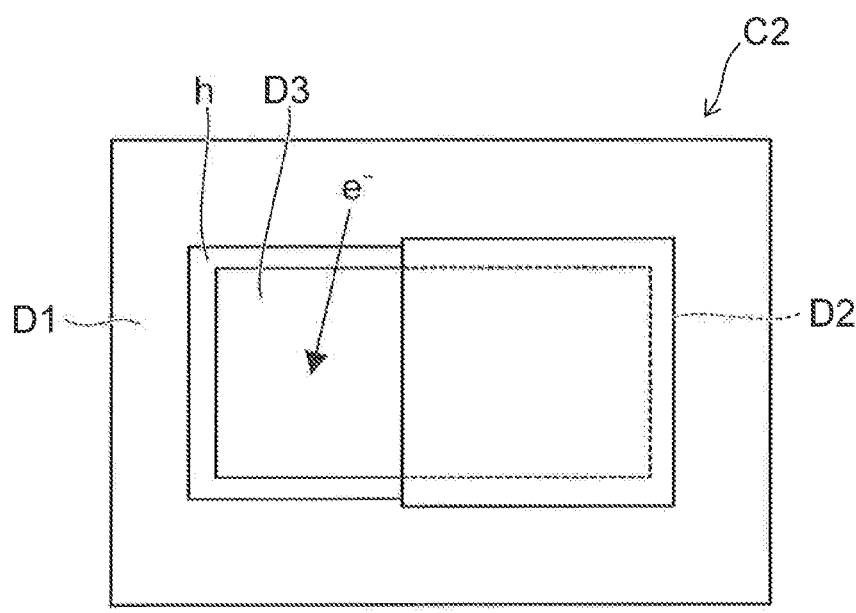
FIG. 10A and FIG. 10B are schematic views illustrating a portion of a neuron learning type integrated circuit device according to a third embodiment.
Figure 10B:
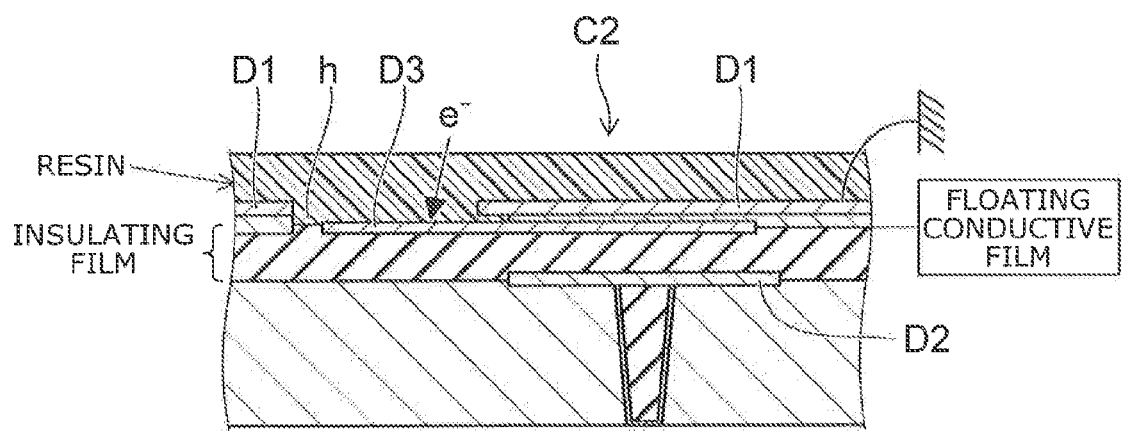

FIG. 10A and FIG. 10B are schematic views illustrating a portion of a neuron learning type integrated circuit device according to a third embodiment.

A schematic plan view illustrating a portion of the floating conductive film D3 is shown in FIG. 10A. A schematic cross-sectional view illustrating a portion of the floating conductive film D3 is shown in FIG. 10B.

The second condenser C2 includes the first plate electrode D1, the second plate electrode D2, and the floating conductive film D3. An opening h is provided in the first plate electrode D1. The floating conductive film D3 extends to the position of the opening h from between the first plate electrode D1 and the second plate electrode D2. Accordingly, the extended portion of the floating conductive film D3 is disposed on the lower side of the opening h when viewed in the direction in which the first plate electrode D1 and the second plate electrode D2 overlap.

Because such an opening h is provided, the amount of charge of the floating conductive film D3 is measured easily via the opening h. In the neuron learning type integrated circuit device according to the embodiment, the capacitance of the second condenser C2 changes due to learning. Accordingly, it is possible to read the learning content of the neuron learning type integrated circuit device by recording the amount of charge that is measured and the position of the second condenser C2.

On the other hand, charge may be stored in the floating conductive film D3 by irradiating, for example, an electron beam by an electron beam lithography apparatus onto the floating conductive film D3 via the opening h. Thereby, programming of the learning content is performed. For example, programming is performed by reading the learning content and matching the learning content with the relationship between the position and amount of charge of the second condenser C2 that are recorded. Thereby, the learning content can be reproduced from one neuron learning type integrated circuit device to another neuron learning type integrated circuit device.

EXAMPLES

Examples of the neuron learning type integrated circuit device will now be described.

The neuron learning type integrated circuit device according to the examples includes functions such as those of the brain of a human who grows while repeating self-learning. Among these, in particular, the cerebral cortex functions are at the center. In other words, the function of appropriately processing the signal processes input from the various receptors and instantaneously returning the result to the core unit of the brain is at the center. Then, the object is to achieve the many types of functions of various classification, judgment, and higher taxa classification: how to recognize (how to sense cultural/social matters, judgments, learning functions, knowledge memory, the senses of Japanese, new sensations, etc.).

The neuron learning type integrated circuit device according to the examples can freely embed a neural network configuration using the neuron equivalent circuit as the base. The neuron learning type integrated circuit device according to the examples someday can elucidate physiologic sensory classifications as well as all sorts of processing mechanisms of the brain by the receptors and the multiple neuron functions and fully imitate their equivalent circuits. Ultimately, the aim is to realize control similarly to the human brain by such embedding and logic circuits.

To assist functions for which a circuit that is equivalent to the human brain cannot be expressed, a neuron integrated circuit that is closer to that of a human is made by arranging IPS cells having such functions and extracting the signals emitted from the IPS cells.

Thereby, starting with various sensory information controls in the field of community support, the fields of education/medicine/family care for the falling birthrate/rapidly aging population, and smart community projects for the information age, the target is to provide activity in various fields such as the technology to control various big data, etc., ICT (Information and Communication Technology)/cloud technology that combines such technology, etc. The final target is for the neuron learning type integrated circuit device according to the examples to be helpful to support the enjoyment of a more abundant standard of living in endlessly developing fields.

First, in the description of the examples in the text, the neurons divided into a wide variety of functions are generally referred to as neuron cells. Also, the input unit of a designated neuron cell is transmitted from the receptors. Then, responding (reacting) to the signal of some physical energy there, the result of complex processing is transmitted to designated neurons.

At this time, the signals are transmitted directly to the neurons and are handled as the input signals of an aggregate of these diverse cells (neuron equivalent circuits). These are called neuron groups. The neuron groups then make aggregates from which the outputs are input signals of neuron blocks. Further, the output of the neuron block functions as one type of computer system that is connected in 6 layers of levels and derives one precise classification (reaction) discrimination result. This is defined as a neuron column in the embodiments.

Roughly, mapping (sense-making) is performed as three-dimensional spatial domain information to evaluate such relationships and connection relationships based on the output information of a neuron column somewhere inside the brain. Thereby, hash keys are made to perform high-speed recognition and judgment of matters and provide a learning type neuron-integrated circuit that also includes a series of functions to search, designate, and extract at high speed even for enormous data.

Inside the human brain, the functions recited above are realized in a portion of the cerebral cortex which is representative of the brain. At this time, the following are included in the signals of the physical energy from the receptors output (derived) at some stage of the various neurons.

The somatic senses (vision, hearing, touch, taste, smell, and touch) of physiology are not just the simple transmission of sensations of the skin to the brain. It is said that the somatic senses include diverse functions such as the superficial sensations (touch, pain, and temperature), the deep sensations (pressure, position, vibration, etc.), the cortical senses (two-point discrimination, stereodifferentiation, etc.), etc.

Additionally, it is said that the sensations include the internal organ senses, the sense of balance, the sense of depth, and the vestibular sense which is the organization in which tilting of the head and movement (acceleration) are sensed by the semicircular canals of the inner ear, etc., converted into neural activity information, and processed by the brain.

Therefore, a knowledge hash map for correlating all of these signals to be associated and used as the material for any judgment is programmed and stored beforehand in designated neurons (here, neuron aggregates of a short-term memory region) as a search engine.

Thereby, the information to be derived (for example, only a photograph, a video image, or hearing a voice) can be derived as desired at any time by following the knowledge hash map correlated by learning as-is. In other words, the memory region is derived from inside the designated neurons that contain a large amount of information. Then, this is an organization in which the information can be directly extracted by accessing the neurons. (This is called a "knowledge hash map").

Although a description of the entire nervous system (the neurons) of the brain is omitted, it is easy to develop the applicable range of the embodiments for the neuron functions of the examples as necessary as the series of interactions are elucidated and the organizations (mechanisms) between neurons are elucidated by future technology in the field of neuroscience.

In the example, the components of behavior control, intelligent learning, etc., by the brain in particular are divided largely into 3 components and described.

The first is the receptors that receive external signals (various sensor signals).

The second is the neural circuit (the neurons and the network of the neurons) for providing materials for behavior, judgments, etc., by transmitting the signals (signals) from the receptors to any neuron cell equivalent circuit, processing the transmitted signals inside the neuron network framework, combining the processed signals, bundling the processed signals, and forming aggregates of the processed signals.

The third is the core unit (similar to the CPU of a computer) of the brain that transmits the information from the neural circuit to the core unit of the brain through the thalamus, etc., and performs the behavior and/or judgments of the entirety.

Also, the receptors herein are defined as organs that receive external stimuli. For example, this is divided as sensory signals into 6 (senses: vision, hearing, touch, taste, smell, and touch). Animals have many types of receptors; there are only 1 or 2 receptors for some types; and for other types, there are countless receptors in the entire body.

It is sufficient for the stimuli that are received to be transmitted to the brain and utilized as information for reacting to the external environment as an animal. Numerically as well, it is considered that humans have likewise evolved; and in the example as well, it is possible to dispose (layout) the types and/or number of the neurons according to the characteristics of the neurons in the initial logic design portion to be freely designable.

Also, simulation using FPGAs, etc., can be utilized at the initial stage of the logic design. Generally, many such versatile tools are provided. Accordingly, the development efficiency can be increased by utilizing such versatile tools.

In recent research reports, there is an example in which a receptor (a sensor) was prototyped using a simple semiconductor circuit to replace the receptor of a patient who had an impairment only in the auditory receptor, and the semiconductor circuit had performance functions that were not the same but approached the original performance and functions of the receptor of a human.

The equivalent circuit (the sensor) to replace the impaired unit is made of a semiconductor and embedded; and after artificially connecting to the nervous system, learning is performed for several months in the brain to perform matching between the actual language and the signals that are received by the equivalent circuit, which is called mapping. The technical report indicates that the words of people thereby could be understood based on the signals received from the sensor.

Also, the eyes of people receive electromagnetic waves (visible light ray) of only 360 nanometers (nm) to 400 nm on the short wavelength side and 760 nm to 830 nm on the long wavelength side. Other electromagnetic waves are not received due to over stimulation; and the width of the intensity that can be received for light that is too intense is determined as a threshold.

It is known that although the neural circuit of the sense of sight is extremely precise, the receptor can be replaced by equivalent circuits that embody the neural circuit. For example, CCD sensors, other filter functions, or peripheral logic circuits and various sensor types correspond to such equivalent circuits. These are applied widely in medical treatment, etc.

Here, although the functions of the entire receptor basically are treated as being outside the applicable range of the embodiments, the boundary portions also are provided, in which the portion of the signal received by the receptor, i.e., a so-called sensor unit, for transmitting onward is received by the neuron integrated circuit as the output signal (signal) and returned to the thalamus of the brain after the necessary processing.

Here, the structure design of the embodiments also assumes the functions of the "superficial sensation and deep sensation" which are called the somatic senses of humans as functions of the neuron integrated circuit.

The "superficial sensation" refers to the sense of touch (the sense when touched), the sense of temperature (warmth), the sense of cold (coldness), and the sense of pain (pain). The "deep sensation" refers to the kinesthetic sense (the angles of joints, etc.), the sense of pressure (the sense of being pressed), deep pain, the sense of vibration/an awareness of the body (a change of the tension of muscles, tendons, or joints from receptors inside the muscles or tendons). Also, neuron columns can be laid out to have functions as single bodies of the senses that are said to exist, that is, the "internal organ sense" which is the organization that senses the state (the existence/absence of movement, inflammation, etc.) of the internal organs as information of neural activity by nerves distributed in the internal organs and processes the state in the brain, the "organic sensation" which is the organization that senses and processes nausea, etc., and the "special sensations" which are the sense of sight (viewing with the eyes), the sense of hearing (hearing with the ears), the sense of taste, the sense of smell, and the vestibular sense (the sense of balance).

The basis of the neuron learning type integrated circuit device according to the examples is the configuration of a neuron integrated circuit in which equivalent circuits (organizations) having the following functions (1) to (4) as the functions as neuron columns are embedded and self-learning can be performed to increase the performance of the closed columns themselves.

(1) The sense of sight: the organization that receives and processes signals of light converted into neural activity information by the cells of the retina.

(2) The sense of hearing: the organization that receives and processes signals of sound waves converted into neural activity information by the hairy cells of the inner ear.

Mamushi pit vipers and some boas have an organ (a pit organ) that senses infrared. That is, such snakes can sense the body heat of prey.

(3) The sense of taste: the organization that receives and processes signals of information of chemical substances (water-soluble substances) included in food converted into neural activity information by the taste cells of the tongue, the pharynx, the epiglottis, etc.

(4) The sense of smell: the organization that receives and processes signals of chemical substance (volatile substance) information inside the air converted into neural activity information by olfactory cells at the back of the nasal cavity.

(5) The electroception and the magnetoception: the organizations that receive and process signals converted into neural activity information in addition to (1) to (4) recited above such as electroception found in sharks/rays/catfish but not in humans, magnetoception, etc., that are helpful for the homing instinct of pigeons, etc., also can be handled as one type of the same signal. By embedding a function (described below: knowledge hash map) to associate all of these senses, it is possible to generate knowledge hash maps each time such that functions not found in humans also can be handled inside the learning type neuron integrated circuit as knowledge (knowledge) to realize the future development of functions not found in humans.

Many examples having the cerebral cortex functions at the center will now be described. In the examples, functions of higher taxa classification: how to recognize (how to sense cultural/social matters, the senses of Japanese, new sensations, etc.) having the function of appropriately processing the signal processing input from the receptor and instantaneously returning the result of the processing to the core unit of the brain as the center will be described.

Here, an overview of the examples as an entirety will be described.

Figures 11A, 11B:
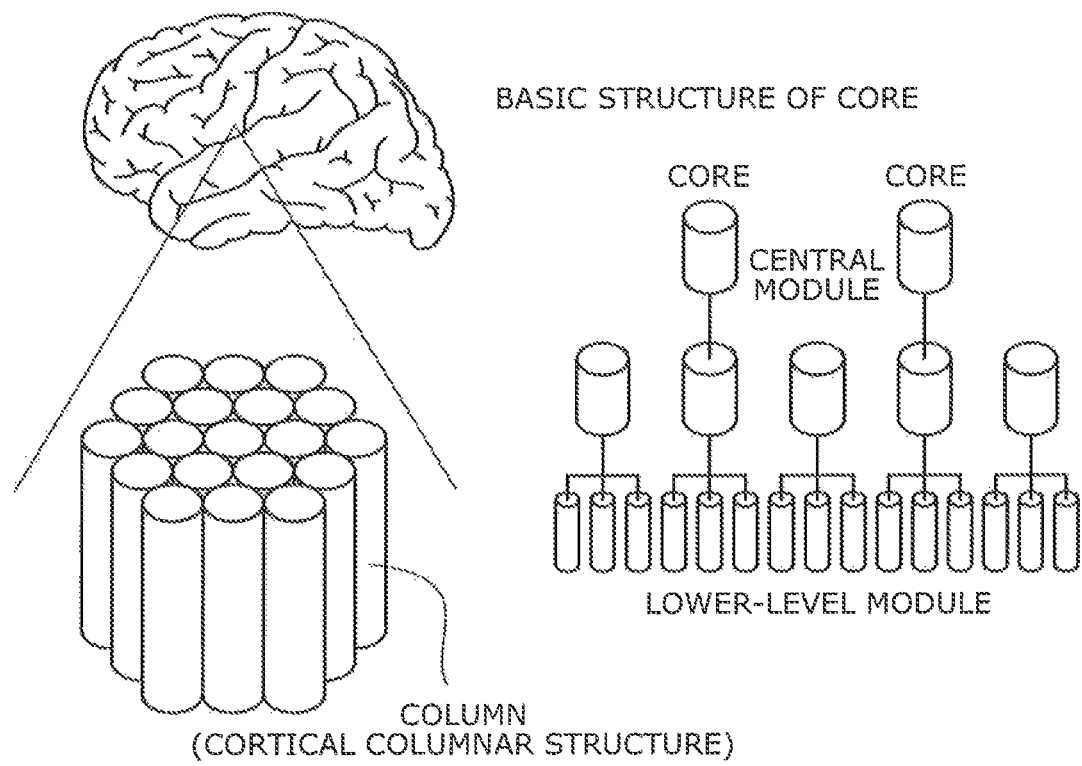
FIG. 11A and FIG. 11B are schematic views illustrating the basic structure of the neuron columns of the neuron semiconductor integrated circuit.

FIG. 11A and FIG. 11B are schematic views illustrating the basic structure of the neuron columns of the neuron semiconductor integrated circuit.

Figures 12A, 12B:
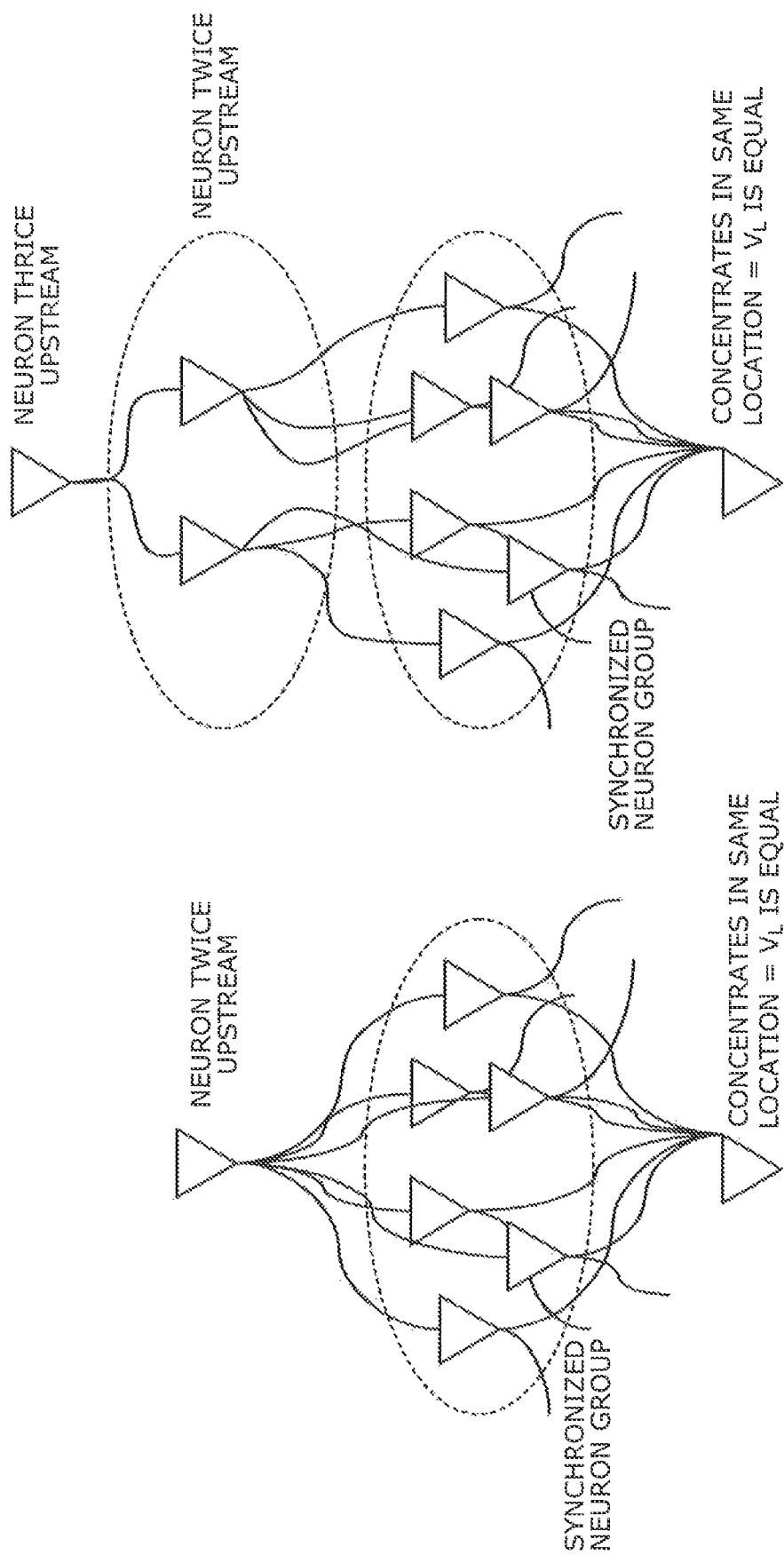
FIG. 12A and FIG. 12B are schematic views illustrating the network image between the neuron cells.

FIG. 12A and FIG. 12B are schematic views illustrating the network image between the neuron cells.

The examples perform intelligent information control that includes functions such as those of the brain of a human who grows while repeating self-learning. The examples propose an extensible neuron type-semiconductor integrated circuit that realizes a colossal neural network of several tens of M or more. Based on knowledge of neurobiology, the example provides a neuron type-semiconductor integrated circuit that manages the information control between the brain stem (the thalamus) and various operation/discrimination functions, association functions, memory functions, and learning functions having a nucleus of a "neuron column-core" that imitates the structure of the brain made of neurons (neurons) and synapses which are one type of switch that connects the neurons.

As recited above, from the article published in "Science" of January 2012, it is considered that it is desirable for the basic configuration of the entire neural network to be such that the connections between the neuron cells are in a state of being able to be largely divided into the two models of the cluster model and the dispersion model and connected as necessary.

Based on such thinking, as shown in FIG. 12A and FIG. 12B, a hierarchical structure going once upstream, twice upstream, and upstream from there and a complex network between the neuron cells between the hierarchical structures is used as the basic structure; and the basic structure is designed to be configured easily.

Figure 13:
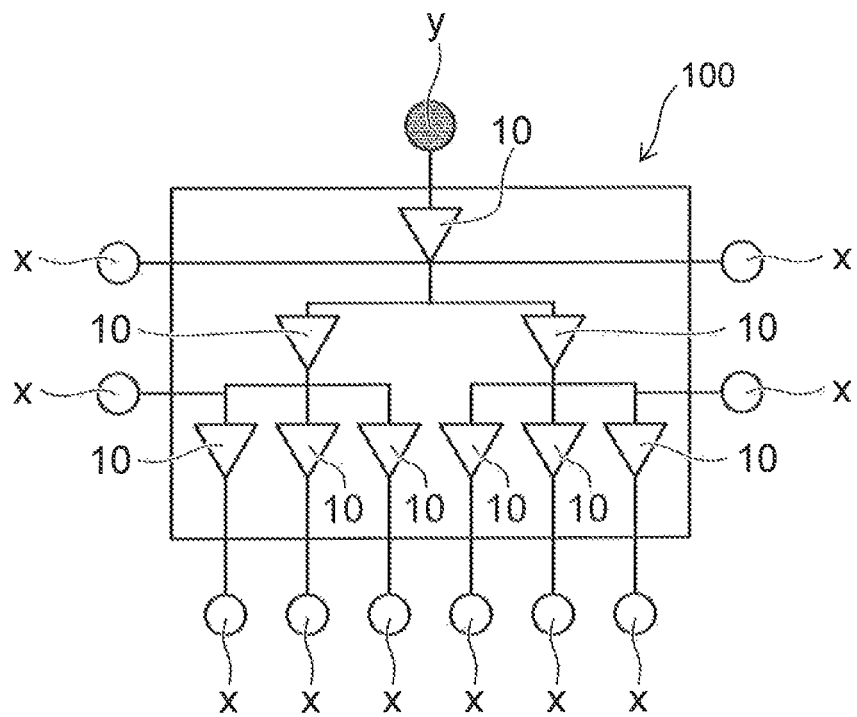
FIG. 13 is a schematic view illustrating the equivalent circuit of the image of the single neuron cell.

Then, an equivalent circuit based on the network image shown in FIG. 12B is shown in FIG. 13 as an example of the image of a single neuron cell. FIG. 13 is a schematic view illustrating the equivalent circuit of the image of the single neuron cell.

Here, among 6 neuron groups that are synchronized, the outputs of the groups of 3 become the two neuron input values of the upper level. Also, the upper two neurons become the inputs of the next 1 neuron; and a logic circuit is formed in which the output signal is that of the neuron of the final level.

In the logic circuit, NAND, NOR, XOR, and EQ are shown using AND, OR, and NOT as in the row "algebraic notation" of Table 1; and OR can be configured using AND and NOT. Because a NAND a is the same as NOT a, all of the other operations can be expressed using only NAND. Accordingly, arithmetic operations such as addition, subtraction, multiplication, and division and complex operations can be realized using only an electronic circuit (a logic circuit) that can perform this logical operation. Generally, a CMOS_NAND circuit is often used as the method for realizing the basic configuration of complex logical operations in a computer.

TABLE 1

|  |  | NAND | NOR | XOR | XNOR (EQ) |
|---|---|---|---|---|---|
| Japanese name |  | Not AND | Not OR | Exclusive OR | Not XOR (equivalent) |
| Logicol operator |  | $\neg(a \wedge b)$ | $\neg(a \vee b)$ | $a \oplus b$ | $a \equiv b$ |
| Algebraic notation |  | ab | a + b | ab + ab | ab + ab |
| a | b | $\neg(a \wedge b)$ | $\neg(a \vee b)$ | $a \oplus b\|$ | $a \equiv b$ |
| 0 | 0 | 1 | 1 | 0 | 1 |
| 0 | 1 | 1 | 0 | 1 | 0 |
| 1 | 0 | 1 | 0 | 1 | 0 |
| 1 | 1 | 0 | 0 | 0 | 1 |

Also, the structure of the neuron cell includes a CMOS_NAND circuit as the equivalent circuit. Also, a complex arithmetic circuit can be made on the hardware by modifying the interconnects therebetween. Further, any information can be programmed to or read from the neuron cell.

There are cases where the thinking of a human changes according to physical condition. Corresponding to such a case, behavior in the neuron equivalent circuit that is similar to the change of the manic/depressive potential of a human is realized by subtly changing the base voltage. Also, in the case where the operation results are subtly different, a structure may be used in which a feedback circuit is provided partway and it is possible to self-output a value to converge to a reference value and correct (self-learning function) the output value by self-learning. Such a method also is realizable by making an equivalent circuit by skillfully connecting the logic circuit.

Also, the circuit may be simple or complex as appropriate. Such corrections of the disposition of the neuron equivalent circuit also contribute to the integration when embedding inside the neuron chip. The examples are applied to all sorts of variations in which neuron equivalent circuits that are already made into IP (Intellectual Property) by function can be appropriately arranged.

For example, the case is considered where 1000 of the same processing are to be performed in parallel inside the brain. In the case where neuron equivalent circuits are made of a semiconductor, for 1000 neuron equivalent circuits, the output value of the processing result output from the group (1000) basically should be an output of exactly the same data if the input information entering the neurons is exactly the same.

However, the neural circuit of the human brain is not so. Even when the same processing is performed similarly using 1000 neurons as the group in a human, it is quite unlikely for the small portions (the complex network, the strength of the connections, etc.) of each neuron to grow to be in exactly the same state. For example, even if the same information is input to similar neurons as information, and even though a similar result may be output, it is not considered likely that exactly the same output result will be obtained due to subtle differences in the interiors of the neurons.

It can be said that self-learning can being performed to cause all of the results, which include similar outputs, completely different results, etc., to be the same output as the sample by making judgments of the internal medicine at the aggregate of the result or by subtly correcting the output result inside the neurons.

Figure 14:
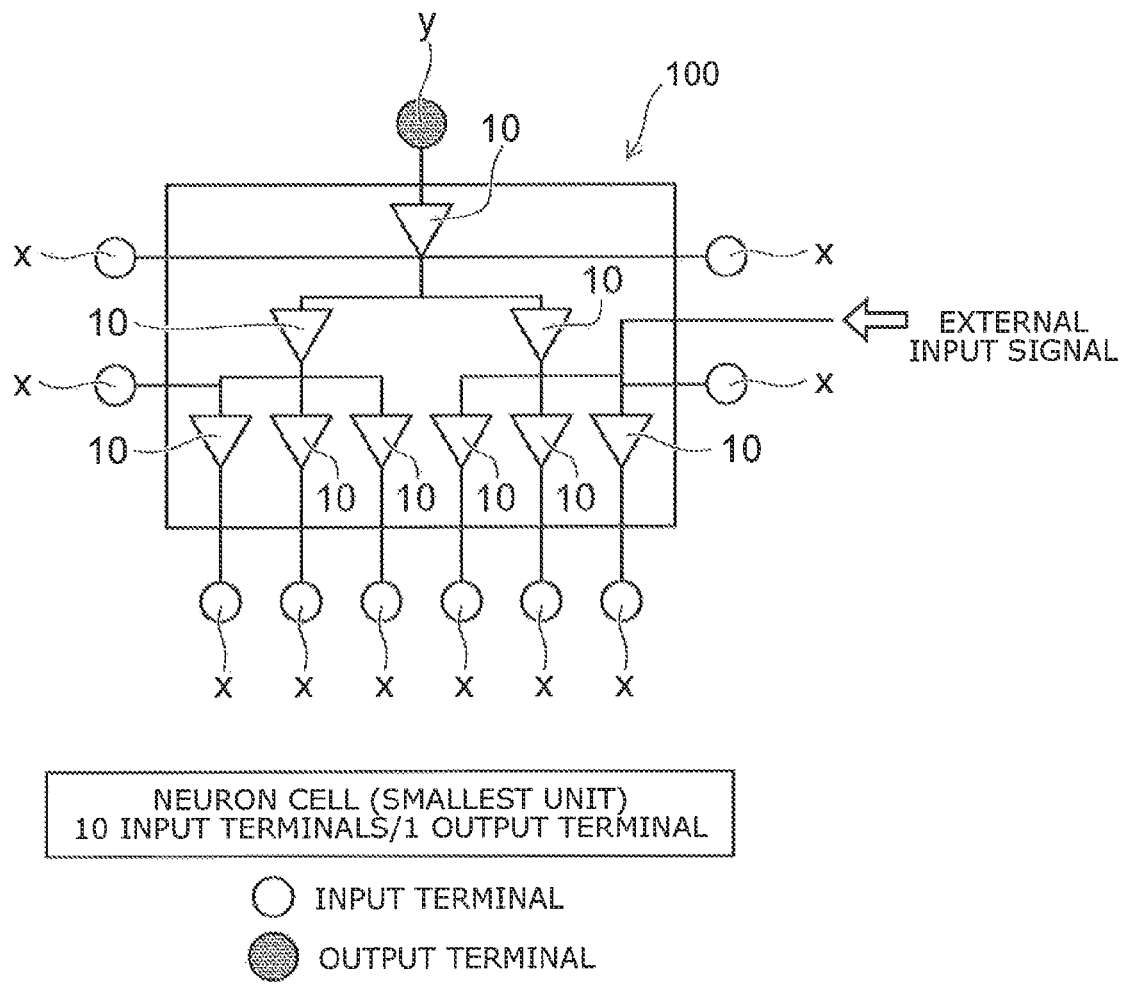
FIG. 14 is a schematic view illustrating a configuration in which the information is controlled by a signal input from outside the neurons.

However, it is also considered unlikely that a learning function exists for all cases of the neurons. FIG. 14 attempts to realize the necessary functions within the combination of the methods for self-feedback and self-feedforward of subtly different output results inside a closed neuron group, a method for modifying the base voltage for operation, or by not closing the same neuron group and using a desired signal directly from another separate correction-dedicated neuron group provided for learning by reflecting some rule. FIG. 14 is a schematic view illustrating a configuration in which the information is controlled by a signal input from outside the neurons. In such a case, the logic circuit that includes the neuron cell has the advantage of being simple.

Further, a good point of such a case is that the greatest advantage of the neuron circuit made in a semiconductor basically is that if all of the information is the same, except for defective elements, exactly the same output result can be derived.

Such results are difficult for the neurons of a human. Conversely, mutually-different output results are derived by inputting mutually-different information from outside the neurons. Therefore, the external input of the signal (signal) from the outside can be treated equivalently as one type of hash key for information encryption.

Although the utilization of information processing by hashing is omitted here and described in detail below in a utilization example of hashing, put simply, a hash key for associating according to any category division (for example, 1000 categories) for one input information (for example, the image information of a person) and correlating by hashing (knowledge hash map) can be performed; and the information can be derived using the knowledge hash map in a scene of searching in which enormous information is searched at high speed.

The examples include a neuron equivalent circuit corresponding to the change of the manic/depressive potential of a human that is closer to the human brain, and as applications of the neuron equivalent circuit, also includes neurons that perform information encryption, correlation by hashing, etc. The examples can easily realize a neuron integrated circuit that includes high-speed search functions and can learn and grow.

First Example

The neuron learning type integrated circuit device according to a first example employs the basic configuration focusing on the following aspects based on an overview of the neuron integrated circuit recited above.

(1) One neuron cell unit 100 includes multiple synapse circuits 10 equivalent to circuits of the nervous system of a human.

(2) An equivalent circuit of the threshold learning type neuron model being configured by a single neuron cell unit 100 or the state of mutual connections of the multiple neuron cell units 100 being configured as one neuron group (cluster).

(3) In addition to logical operations and/or discrimination functions, machine-readable pattern memory functions, etc., association functions, or functions of controlling a series of feedback, feedforward, and looping and/or a series of flows being embedded arbitrarily in multiple neuron cell units 100 or a portion inside grouping (clustering). Thereby, a hybrid type neuron cell unit 100 that also includes complex logic is designed. Also, it becomes possible to easily design neuron equivalent circuits having different functions by such combinations.

Also, as a superordinate concept, the neuron equivalent circuits can be further interconnect-connected to be able to exchange information as a neural network. Thereby, it is possible to realize processing that is more complex. Thus, a neuron type-semiconductor integrated circuit is configured from a mutual interconnect list provided with degrees of freedom of design.

Second Example

Here, for the single equivalent circuit of the neuron cell unit 100, in addition the recommendation referring to FIG. 1, etc., it is desirable to verify equivalent circuits as necessary and to make neuron equivalent circuits into IP having various characteristics (divided into characteristics by function such as energy conservation, processing speed, semiconductor manufacturing cost, etc.).

According to the neuron learning type integrated circuit device according to the example, operations are performed without using a pre-prepared program. In other words, because the function of the neurons (the synapses) of the human brain also are included, the basic unit is configured by defining the basic interconnect structure in the example beforehand to manage the cooperation between the neuron column-cores.

The function design is performed after clarifying, at least when estimating the initial stage, which functions are to be performed by the neuron integrated circuit as the basic function of the brain (for example, the following functions of viewing a person (field of view) and associating and determining the name of the person from within all sorts of categories) as the role of the basic interconnect structure.

Also, as the design development, the design of the neuron columns for the functions to be processed is performed, and in particular, the column basic design is performed based on the number of neurons, the number of synapses, the processing speed, the processing voltage, and the distributed processing scale (e.g., whether or not to perform 1000 streams of parallel processing or 10000 streams of parallel processing, whether or not advanced processing is to be possible by connecting the columns in series, etc.) by considerations due to the processing scale.

Further, for the functions of the brain executing parallel processing, it is possible to perform a simulation beforehand of the flow of dividing the field of view information into applications such as for pattern recognition, for associative memory, for category classification, etc., and processing between the applications to verify the appropriateness of the flow to perform a pre-verification of the effectiveness of the knowledge hash map; and subsequent learning and/or correcting of the data may be performed.

Third Example

When the design development such as that recited above can be performed, then, the correlation (the knowledge hash map) of the design development is assembled into a flow; and the basic interconnects for the correlation between the neuron columns are performed.

Although elaborated below, in the design development, the interconnect design of the neuron equivalent circuits, the interconnect design between the neurons, the disposition interconnect design of the neuron groups which are the aggregates of the neurons which are the level above the neurons, the neuron blocks which are the aggregates of the groups, and 6-layer structure inside the neuron columns which are the aggregates of the blocks, the inter-column basic interconnect design lists which are the level above the columns, the intra-neuron chip interconnect lists which are above the inter-column basic interconnect design lists, and the neuron chip itself are assembled into a hierarchical structure.

The basic interconnect of the neuron integrated circuit is realized by a list that disposition-interconnects between the hierarchical structure by a TSV (Through Silicon Via) method. The TSV method is a method for electrically connecting between stacked chips by a via interconnect that pierces a semiconductor substrate of silicon or the like. Thereby, a large-scale learning type neuron integrated circuit can be realized. In such a case, it is desirable for the equivalent circuits of single neuron cells to be made into IP that can be freely selected by the user.

Learning is performed in the neuron chip using the neuron integrated circuits made by the design development described above. This is elaborated below; and here, learning by a teacher is simply repeated; the information is stored in the neuron chip; and the metadata, the content (the classification information), etc., are associated when storing. Thereby, the information inside the neuron chip is organized.

Fourth Example

Here, an example of the overall structure of the neuron type-semiconductor integrated circuit will be described.

First, the single neuron cell units 100, the aggregates of the neuron cell units 100 as the neuron groups, the aggregates of the neuron groups as the neuron blocks, and the neuron blocks in levels of 6 layers are called the neuron columns. One neuron column is configured by a complex network being configured between the neuron cell units 100 (referring to FIG. 11A).

Further, in the neuron type-integrated circuit, one chip can be configured by orderly arranging a large amount of the neuron columns on the chip. Further, when disposing the columns on the chip, neural networks are configured also between the columns by disposition interconnect lists respectively for the neural networks. Also, the initial interconnect configuration is determined by the disposition interconnect list. Correction of the disposition interconnect list also can be performed freely. Here, the overall structure can be designed by defining the hierarchical structure of any neuron cell to design, in a large sense, the entire neuron learning type integrated circuit.

Fifth Example

The electrical connections between the multiple neuron cell units 100 change dynamically by the learning. Also, the connections themselves between the multiple neuron cell units 100 change dynamically by interactions. Thereby, one neuron column has functions equivalent to those of a small computer; and a circuit that is equivalent to the structural function of the human brain is realized.

To this end, a hierarchical multilayered network is configured based on the second interconnect list to have a network structure also between the columns. Thereby, a giant neuron network that imitates the nervous system of a human as an entirety can be expressed even logically. Further, as necessary, functions of high-speed logical operation processing or various judgment and identification functions, etc., are embedded inside the neuron columns as logic circuits.

The neuron learning type integrated circuit device according to the example is a hybrid learning type neuron-semiconductor integrated circuit that includes various functions such as learning type neurons, neurons having mainly logic circuits for operations, hashing functions for the high-speed search of large amounts of information, etc.

Sixth example

The example is not limited to the examples described below relating to the "neuron circuit model (single neuron cell)." For example, because it is considered that various neuron models due to technological innovations will be devised in the future, IP-ization may be performed such that the appropriate neuron circuit models can be appropriately selected as necessary to make the entirety nervous system circuit. The interfaces between the IP may be standardized.

Further, this is a circuit in which the neurons themselves learn and make organic connections between themselves. In the neuron learning type integrated circuit device according to the example, it is easy for the basic structure of the column to be, for example, a multiple hierarchical structure (generally said to be 6 layers in a human) that resembles the structure of the neurons of a human with the cerebral cortex which is representative of the neurons at the center.

In the neuron learning type integrated circuit device according to the example, it is possible to define the flow of the processing of the 52 brain functions that are said to be the functional structure of the human brain, supervise the processing for each of the functions, and perform the overall processing. Further, the interconnects that transmit the output result of the information output from the column to the next column as input information is defined by the second interconnect list. Thereby, complex processing can be realized.

Seventh Example

A "method for non-Von Neumann type-parallel processing" using a learning type-neuron integrated circuit will now be described.

In the sense of learning type, multiple types of "neuron column-cores" are configured; and for a series of processing, parallel processing is performed by aggregates of neuron columns having the same function. It is necessary also to make neurons in which the measure of the certainty is included such that these neurons are only for sorting and determining the optimal aggregate (closest to the true value) inside the final spatial aggregate based on the processing results of the entire parallel processing.

Eighth example

"Reproducing a neuron learning type integrated circuit of the learning type" will now be described.

The learning of the results of the information processing can be performed inside the aggregate of the neuron circuits included in the neuron column-core. Further, the content of the aggregate can be output as stream data of a FPGA with an initial value of the neuron network at some point in time (for example, the intelligence of a 3-year old child) cultivated by simulation and/or learning to determine the optimal solution. Thereby, the processing can be artificially reproduced by using the FPGA. In other words, the intelligence of, for example, the 3-year old child that was nurtured by the neuron columns can be read and reproduced in another chip.

As smaller peripheral functions, it is also possible for the clock frequency and/or voltage of operation to be different between the columns. Also, it is logically possible to dispose a logic circuit that strengthens the connections between the neuron columns due to resonance and enhancement of the operation frequency between the neurons. This can be realized easily by operations by simply switching the operating voltage between the neuron cells configured in a block. Such neuron cells are employed in the example.

Further, a neuron-semiconductor integrated circuit, etc., that realizes power conservation also can be provided by including switching devices and functions for power saving.

Ninth Example

An example of the structure of a column will now be described.

As shown in FIG. 11, the column structure is made in levels for the functional aspect as well and is configured with lower-level modules (columns), mid-level modules (columns), and central modules (columns). The column configuration disperses the functions in the lower-level modules that are already completely different from the Von Neumann method, and bundles these to compile into meaningful functions. In other words, a design is possible such that non-Von Neumann method processing is performed.

Tenth Example

"A part (the cerebral neocortex) of the human brain" is described as an example as a representative part that is called the column.

The cerebral neocortex generally is taken to be configured in a "column (cortical columnar structure)." It is considered that small functional/structural units are concentrated in the cerebral neocortex.

In the case of an actual human, it is said that the diameter of the cerebral neocortex is about 0.5 mm and the height of the cerebral neocortex (the thickness of the cortex) is 2 to 3 mm. It is said that 30 thousand to 40 thousand neurons (neurons) exist inside the cerebral neocortex. Further, it is said that the columns that resemble each other concentrate to form larger units of "modules" (having sizes of ten and several millimeters to several tens of millimeters).

Thus, one column independently performs processing on the neuron network of all sorts of input signals as a computer that performs one function and outputs the result to the output unit of the column. The definition of the input/output interconnects is designed in the design development; and the neuron cells themselves can perform self-learning and correcting.

Also, the interior of the column is divided largely into 6 layers; and the columns are electrically insulated from each other. Then, each of the columns is a module that performs one function. The columns are connected to each other by the neural network interconnects. The neural network interconnects are determined by the interconnect lists.

Various parallel processing is realized by the operations of the parallel hierarchical system. The parallel hierarchical system is such that abstraction is performed inside the aggregate of the columns and some judgment is made. Further, it is desirable for some of the columns to be standardized as neuron cells to perform storage as a memory unit (the long-term memory of the brain) which is a typical function of the cerebral cortex. For example, it is desirable for a neuron cell that has nonvolatile characteristics, low power consumption, and is inexpensive or a neuron cell that has high integration and is easy to perform semiconductor manufacturing to be appropriately selected, or for the neuron cell to be able to be selected as IP.

Further, this has not merely the memory function but can extract an output signal for any input signal. It is said that short-term memory, names and/or telephone numbers of people, etc., are stored in the part of the brain called the "hippocampus" in the human brain to be stored and remembered. The neuron cells themselves of the column may have specifications to withstand fast processing times and high reprogramming frequencies. It is said that a human forgets many things in about 2 weeks. Therefore, it is sufficient to use comprehensive judgment to select an IP cell that is similar.

One column includes multiple I/O interconnects that connect between the soma circuits, the multiple operation logic circuits, and the columns.

As the input signal to one column, columns that perform determined functions of converting (filtering, performing Fourier transforms, signal thinning, amplifying, and logical operations of) the signal are disposed in a lattice configuration and disposed in the surface of a semiconductor substrate of silicon or the like.

Among these, it is possible to have any structure between the columns that receives the column output signal and amplifies, attenuates, and resonates the signal; and a hybrid structure of so-called learning type neurons, neurons that have logical operation functions, etc., may be used.

Eleventh Example

The case where a portion of the neuron cells divided into 6 layers inside the column includes the function of a hash function will now be described as an example of the processing function of the column.

As one example, the column structure is configured to be a neuron column of 6 layers. In the column structure, neuron cells that have one function have organic connections in each layer in a hierarchical structure. As one example, the neuron cell unit 100 includes 1000 neurons, and 1000 synapse equivalent circuits for each neuron.

A first example is the case where one photograph image A (information having a size of 2 MBytes) data is input and a hash value (sequence information (an index)) of 32 bits (4 bytes) is output as the result of processing in an intermediate layer. In such a case, there are about 42 billion arrangements that can be represented by the hash; and the memory location of the photograph image A is arbitrarily determined to be one location.

For example, it is said that the highest number of people (photographs) that a human can remember is 40 thousand. Accordingly, a hash value of 16 bits (65536 people) is sufficient; and the names of 40 thousand people can be designated using a memory capacity of 2 bytes×65536=130 Kbytes as the memory space. Also, the human can be identified further by pre-allotting hash keys (encryption keys) that are different from the hash function for, for example, each classification category such as male/female, hometown, age, etc., and associating between each of the categories for the same human image.

Twelfth Example

IP-ization of columns will now be described.

Several examples of a basic cell structure example of one neuron LSI and hybrid type neuron circuits that include logic circuits have been illustrated using FIG. 2 to FIG. 14. The neuron circuit model (the single neuron cell) itself is not limited thereto; and various neuron models will be devised in the future by technological innovations, etc. By making such models into IP, it is optimal to make the columns of the entire nervous system circuit by appropriately disposing and selecting appropriate neuron circuit models and/or logical operation circuits as necessary.

For example, it is generally considered to be a good method to use neuron circuit functions A, B, . . . , and Z that are pre-registered as IP and to standardize only the connections between the neurons.

Then, for the connections between the single neuron cell parts inside the column, the minimum neural function is provided by the multiple neuron cells being organically connected and made into one neuron network. Thereby, a block is made as a minimum neuron computer. Here, the neuron cells (cells) that are comprehensively combined into one function are called a column hereafter.

A hierarchical structure having several stages (for example, 6 levels) is illustrated as an example of the basic structure of the column. For the neuron cells (cells), an aggregate of the neuron cells is called a neuron cell block (cell_block) and disposed in each of the levels of 1 column; and further, the cell_blocks are assembled into 6 levels. These are called cell-1 to cell-6 for convenience when assembled together. It is also possible to use a complex network connection to connect the neurons to each other in a FULL network as necessary. "Inter-neuron interconnect lists 1 and 2" are made to be any interconnect based on data that defines the connection states between the columns. This is the same as methods of general logic design.

In such a case, a start is made by defining the scale of the columns. First, the maximum number of neurons and number of synapses are designated; and any network including logic circuits is embedded from the start as necessary. As a result, it becomes possible to embed columns having various functions inside one chip.

Continuing, the mutual network configuration between the columns is defined by "inter-neuron interconnect lists 3 and 4." Further, an "inter-neuron interconnect list 5" is defined as an interconnect list for performing the network interconnect between the columns outside one neuron chip between above and below when the neuron chips are stacked in a hierarchical configuration.

Also, for the "intra-column inter-level interconnect list 1" that is used at this time, the interior of the column is divided and defined into multiple levels (as an example here, 6 layers). These are called the intra-column levels 1 to 6 to match the hierarchical structure inside the column.

Here, each of the clock frequencies of the six levels 1 to 6 inside the column may be changeable as necessary. In such a case, the logic design is performed such that the operations can be independent.

Also, the design is not limited to such tools; and if the necessary connections are considered, any tool may be used.

Here, the levels of the interconnect lists are organized as follows.

As a premise to the description, the smallest unit of the neuron cell type-semiconductor integrated circuit is the "neuron cell-core;" and, for example, several to several tens of cores of neuron cells are made and registered as IP.

Basically, the "neuron cell-cores" that are made into IP are disposed (laid out) and interconnected in an LSI. The "(single) neuron cell-core" is called the cell-core-xxn.

(1) "Neuron cell-inter-core interconnect list" (hierarchical level 1: group)

This is an inter-neuron cell interconnect list that defines how to connect between the neuron cell-cores.

Here, the circuits that are connected by the interconnects are called a neuron cell-group (cell-group).

(2) "Neuron cell-inter-block interconnect list"

Then, the neuron cell-groups, in which the multiple neuron cell-cores are grouped, are connected further to form a neuron cell-block.

(3) "Intra-column layer interconnect list"

Then, the application layers for determining how to dispose the multiple neuron cell-blocks in the 6 layers inside the column, how to connect to the upstream/downstream layers, and how to perform the series of processing are determined; and the interconnects that draw out the neuron cell-blocks to the upper/lower layers are determined. The "intra-column interconnect list" determines the interconnects.

(4) "Inter-column interconnect list"

Then, the interconnect list for determining how to correlate and interconnect the multiple columns is the "inter-column list."

(5) "Inter-neuron chip interconnect list"

TSV interconnects, etc., are considered as the multilevel interconnect circuit between the neuron chips, and are used mainly when connecting in series.

(6) The connection definition of the complex interconnect circuits straddling (1) to (5) recited above, and the definition of the cooperation I/O unit to peripheral chips.

This list is not for the upper and lower layers of the chip but for the connection definition in the outer circumferential region of the neuron chip as function extension interconnects that are two-dimensionally disposed to extend the functions.

Thirteenth Example

The design of a specific neuron type integrated circuit will now be described.

(1) First, logic synthesis tools and layout tools provided by venders and third parties are used as the design environment. First, starting from the design of the environment in which the logic circuits operate, prototypes are evaluated using FPGAs.

(2) Here, it is possible to perform the logic design in a HDL (Hardware Description Language) such as VHDL (VHSIC HDL), Verilog HDL, etc.

(3) Although at the current stage the design is performed by manually dividing the processing between hardware and software at the specification stage and dividing "hardware using HDL" and "software using, for example, the C programming language, etc.," up to now, functions such as those of processors and DSPs are realizable in the FPGA interior, and therefore the I/O control of the information to the neuron circuits can be implemented by software.

Now, description design including hardware/software is performed using the C programming language, etc.; the I/O portion recited above is omitted from the description herein; and the design flow of examples only for the design of neuron circuits will be described.

The equivalent circuit is completed by first, (1) design input using a HDL programming language, (2) design synthesis using logic synthesis tools, (3) design verification using logic simulations, (4) verification OK, (5) implementation of the design, and (6) setting the logic circuit in the FPGA.

Fourteenth Example

Reproduction of a neuron chip will now be described.

The neuron learning type integrated circuit device according to the example is a device in which logic circuits according to the complex large-scale neural circuits of a human and logic circuits that perform personal growth by learning evolve. A neuron chip in which the neuron learning type integrated circuit device is embedded can be manufactured in large amounts at some point in time.

(1) First, the data of each logic of the neuron chip for which self-learning has been performed is read by some method.

(2) However, the data that is read is encrypted for each neuron chip. It may be required to decrypt the encryption for each neuron chip to extract the information; and it may be such that the user cannot perform reading. For example, it may be required to request the manufacturer to read the data.

(3) After deciphering the read-encrypted data based on a dedicated neuron data reading device (an encryption deciphering device) at the manufacturer, the information is programmed to a new neuron chip. Thereby, the neuron chip can be reproduced. It is desirable for the chip provider to issue an encryption key for each neuron chip and provide the encryption key when reading and programming so that the user cannot easily reproduce at will.

Fifteenth Example

A method for implementing in a FPGA will now be described.

For the method for implementing in a commercial FPGA, an example in which a simulation is performed for the neuron state at some point in time once the neuron integrated circuit has been operated and learning has been performed by a learning function. In the case where the function of the neuron chip is small-scale, the encryption key issued by the manufacturer is licensed as necessary and used so that a limited portion can be copied to the existing FPGA only once. Thereby, the compromise of information is avoided. Further, it is desirable to basically not be able to reproduce to another neuron chip or another FPGA.

First, in the case of a commercial SRAM-type FPGA, flash memory, an EEPROM, etc., is provided outside when copying the logic circuit information of the neuron chip to the FPGA; and therefore, the information of the neuron chip is copied to the flash memory, EEPROM, etc.

Then, because the program can be set by reading "bit stream data" which is the program file from external memory when turning on the power supply in the commercial FPGA, etc., the content of the neuron integrated circuit is converted to bit stream data for the FPGA when reading and then programmed similarly to registering in the FPGA to reflect the information.

Figure 15:
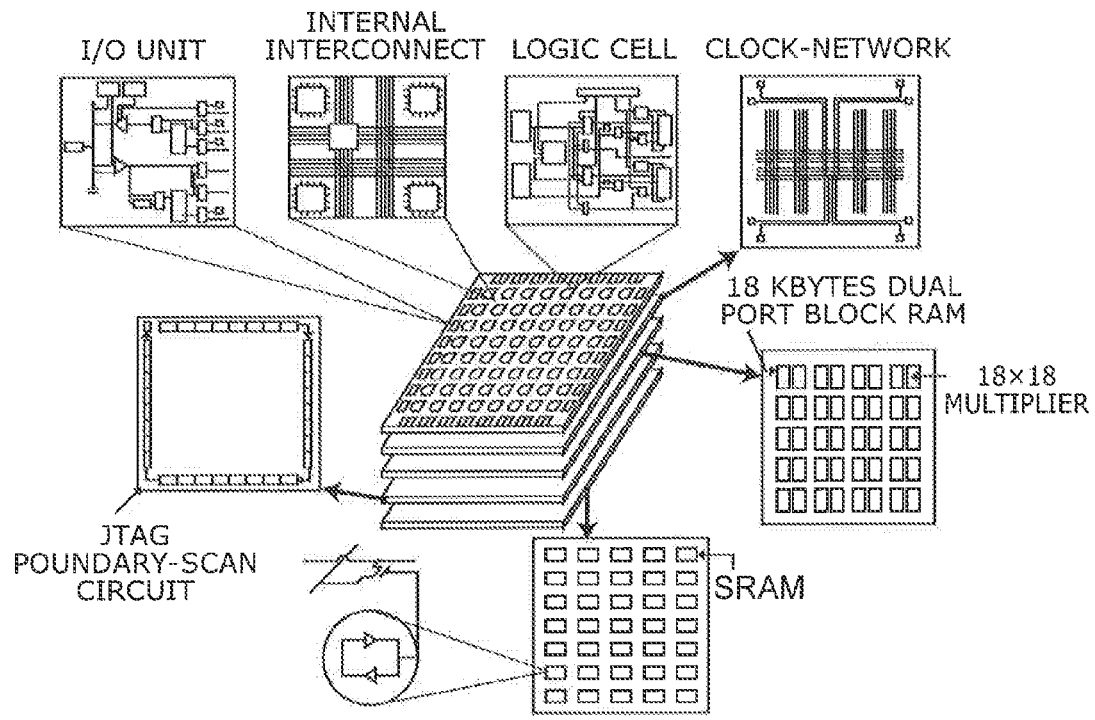
FIG. 15 is a conceptual view of the architecture of a FPGA.

FIG. 15 is a conceptual view of the architecture of a FPGA.

Figure 16:
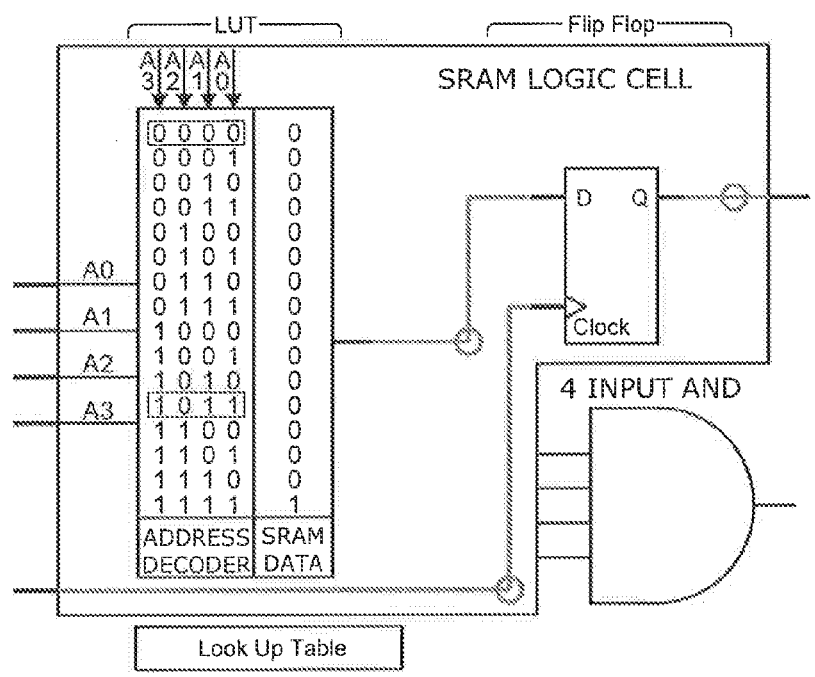
FIG. 16 is a conceptual view showing an example of the lookup table.

FIG. 16 is a conceptual view showing an example of the lookup table.

As shown in FIG. 15, the internal structure of the FPGA is broadly divided into the 6 portions of the I/O unit, the internal interconnect, the logic cell, the clock network, the JTAG boundary-scan circuit, and the block RAM/multiplier. As shown in FIG. 16, in the example of the SRAM-type FPGA, an AND circuit includes the two configurations of a "lookup table: LUT" and a "flip-flop" (Flip Flop).

An equivalent logic circuit can be made in the neuron circuit as well. For example, when the signals from four synapses enter the neuron as the input, the High (1) data is programmed to the location where all of the addresses are 1; the Low (0) data is programmed otherwise; and when all of the inputs are "1," "1" is output and retained as the data.

Subsequently, the data is output at a timing that is synchronized with the system by the flip-flop. In the case where another logic circuit is to be embedded inside the neuron cells, the neuron cells are dispersed over the entire chip surface and disposed from the start; and therefore, it is possible to evaluate the implementation of the neuron chip having the learning by connecting the neuron cells by internal interconnects.

Thus, because a large-scale FPGA such as never before is necessary to configure functions equivalent to those of a neuron chip, the effectiveness of neuron computing including the self-learning function is apparent.

Also, the exchanges with the "I/O units" other than the logic circuits that cannot be expressed in the neuron circuits are allotted to the FPGA. Recently, flexible I/O exists that corresponds to various voltage level/specifications exceeding, for example, 20 types for the neuron circuit; and FPGAs exist that can separate the clock provided to the entire neuron chip and clocks used locally. Accordingly, the optimal power supply and the distribution of the clock to the neuron chip to match the synchronous circuit of the neuron circuit are possible at each location.

For the neuron cells disposed uniformly in the entire neuron chip, there are many cases where logic circuits such as multipliers, adders, etc., are defined by an "interconnect entry list." The user associates the neurons to match the necessary function and capacity without being limited by positions of the circuits inside the neuron cell. For example, in the case where the processing is complex, the combinations of the neuron cells also become complex. By assembling in series or in parallel as necessary, the access and storage of the data can be performed.

Also, although elaborated below, as an organization for instantaneously searching in a large amount of data and drawing out the information, a logic circuit that performs extraction, hashing, and storage of nearly 100 types of features may be embedded in a portion of the neuron cells. Thereby, the target object is extracted instantaneously by associating, learning, and making the feature extraction complex to make it possible to perform a high-speed search using basically one search.

Although not elaborated here, the memory is re-organized at some point in time; the more the feature extraction categories are increased, the more the certainty increases; and the precision of the search increases. To this end, a dedicated neuron hash circuit may be configured; and for hashing, instead of the hashing, the interconnects may be performed randomly for hashing. Learning of the hash keys may be performed such that the hash table output when hashing is dispersed.

Sixteenth Example

A method for adding a hash function inside the neuron cell unit will now be described.

Here, a method for instantaneously performing a super high-speed search from 14 G of data will be described as a utilization of a hash table+α.

Specifically, the hash function that is utilized when drawing out whatever is necessary at high speed from a large amount of data (for example, text, shapes, etc.) by adding the function of hashing to the neuron cell unit will be described.

A hash is a small amount of data used to confirm and/or search data. The hash is generated by some designated algorithm. Here, the focus will be on the hash generally being used as a marker when confirming whether or not a file has been altered or damaged or when searching for designated data from a large amount of data. (hash table)

Here, the logic for making a 16-bit hash table using a neuron cell will be described as one example.

The example is the case where 1 million images of image data of people (for example, 2 MB/image) having a data amount of 2 terabytes (TB) is read as the input of the neuron cell unit and hashing is performed for 100 types of hash keys. As a result, the amount of information of the input of (2 TB×100=200 TB) can be represented as 1 out of 1 million (2 MB×100). As a result of processing using 100 types of hash keys, for example, the hash keys for abstracting (patternizing) and making content of the images of the people are generated and learning is performed (for example, 100 types such as male/female, age group, hometown (domestic/foreign), university graduated from, occupation, company name, current address, hair color, hobby, family details, use/nonuse of social networks (SNS), etc.).

By organically associating the hashes that are learned, it is easy to correctly name the person (the name) for the image of the person. By, for example, learning the images beforehand, it takes a normal computer almost 10 hours to find one image file from 1 million items (2 TB) of data to correctly say whether or not the person to be searched is in the 1 million people, and if so, who the person is. In such a case, in the example, it is considered that the person can be designated by the neuron circuit at the speed of about 360 million times (0.1 milliseconds (msec) or less).

Further, it is theoretically possible to increase the speed limitlessly by parallelization as necessary. Thus, it is possible to immediately and correctly name the name of the person by taking time to learn by hashing and by storing in the memory (the brain) of people as necessary.

Further, because a large amount of categorized feature extractions (100 items) are mapped as recited above as the learning function and the target data are drawn out in one action, a SEO (Search Engine Optimization) function may be added. Thereby, a neuron algorithm can be made whose speed theoretically can be increased limitlessly.

Seventeenth Example

An example in which the information that is hashed is efficiently searched will now be illustrated.

(1) Although image data was used above, applications are possible also when "searching a similar partial character string" from a large amount of data. In such a case, an algorithm that subdivides the input character string group into many small portions and searches for similar portions by applying hash functions for the many small portions is embedded in the neuron. This is not limited to character strings and is applicable also to processing to search for a similar image in a database of images of a two-dimensional plane or a three-dimensional space.

Here, the hash function can be interpreted to subdivide the space into a lattice configuration. Therefore, this can be represented as an arrangement (a grid file) of not less than two dimensions; and any hash value can be returned for any hash key. Also, the original information can be managed by using an arrangement having the hash values as indices.

(2) The second is applicable in the case where the information is weighted and classified into a hierarchical structure partway through the learning. For example, 6 fine levels such as a large category, a medium category, a small category, etc., may be used. It is desirable for 1 level to have a category space of about 50 to 1000 items.

Although the example in which the name of a person is correctly named based on the image information of one person is used in example described above, actually, there may be various information that has been subjected to various judgments and category classifications by the intelligence and judgment of the human. Accordingly, for a corresponding high-speed search, it is an important function to give several examples to be handled so that a selection can be made as necessary.

Eighteenth Example

Several examples as methods for the high-speed search of things that are not necessarily images will now be described.

First, a category classification (a knowledge hash map) of the information to be searched is made.

As an example, categories that directly express what is to be handled such as humans, animals, plants, foods, regions, weathers, locations, money, illnesses, medical charts, human support, occupation sector, etc., are made.

Then, it is also favorable to perform learning by batch if necessary of whether or not it is something that is accessed frequently on the network of the WWW (World Wide Web), the domain, the URL (the Uniform Resource Locator), the site analysis and importance, the value, the popularity, etc.

Further, sites of the internet that are trusted are designated and re-ranked based on including some ranking when searching from such big data, knowledge, something learned from the history, learning by teaching these at some frequency, and machine learning. This is sufficiently implementable by learning by batch at a time when the neuron circuit normally is not used.

Also, at this time, attention must be given to the method for learning. This means that it is necessary to learn by the administrator selecting only the words and information of people that are trusted; and corrections must be possible in the case where corrupt data has been learned mistakenly. Regarding this aspect, for the information from the internet, automatic learning may be performed by utilizing only sites certified by the administrator, etc., registering the sites in a knowledge hash map, and performing the automatic learning based on the knowledge hash map.

Further, growth is possible by tools that can perform further learning by having a API (Application Programming Interface) for a versatile search engine as a peripheral interface function of the neuron integrated circuit.

For example, a function may be transformed to perform learning using only correct information by providing a dedicated content server as a clone for the big data of the entire world as search data or learning data by making APIs that can cooperate with AlltheWeb (Inktomi, Overture, Goo, infoseek, Alltheweb, Inktomi, etc.). Thereby, learning can be performed using engines that search through only correct information.

Nineteenth Example

A failure diagnosis function will now be described.

In the example, the failure diagnosis function is embedded inside the 6 levels of the neuron cells as a logic circuit of the hash function.

Neurons are made such that the neurons of the column of the output unit output some numerical value when some pulse signal (numerical value) is input through the synapses to the neurons inside the column of a determined input unit. Thereby, logic is possible in which the same numerical value always is output as long as the same numerical value is input. It is favorable to include such logic in functions for which uncertainty is necessary. In such a case, the processing is performed by determining a hash key for each classification division.

Conversely, as an example of the case where multiple neurons perform this function for hashing, the case would work as the hash key where synapses of the multiple neurons for the hashing to be performed and the network between the neurons are generated by random numbers such that the same neuron circuit is not made. Accordingly, the function can be achieved easily by embedding a neuron circuit having random interconnect generation for hashing.

This is the same as configuring one computer by a column that bundles the information that is output by many neurons (many classification methods). When neuron cells that have the same function and output some numerical value for some input are bundled and the difference is calculated, if the output results are different, the logic circuit of the neuron cell that outputs the peculiar output data is determined to be a failure. Then, it is possible for another neuron to switch to a new neuron cell and break (cause to be electrically ineffective) the line of the failed neuron so that the column is not used.

For such a failure diagnosis of the neuron cells, the judgment can be performed independently for the column for which these are bundled. Thereby, means for the diagnosis, prevention, avoidance, etc., of the failure for the entirety can be taken.

Also, for the failure diagnosis, it is desirable to perform an appropriate diagnosis by determining the weight of the role performed by the neurons, etc., and performing learning for the frequency, etc., of the diagnosis and the risk of the diagnosis.

Also, the failure diagnosis of the entire column may be performed using not only characters and numerical values but also images, voice information such as music, or all of the characters inside one book that have been digitized beforehand and by, for example, confirming whether or not the same results are output when providing the same information to the entire column and comparing to the results that were processed 1 year ago.

Also, there are cases where the output value changes due to the learning function even in the case where the same information is input; and in the case where mistaken learning has been performed, a correction may be performed by providing feedback of the difference. It is desirable for such processing to be possible as one function of the learning function.

Also, there are cases where breaks or failures occur somewhere in the neuron or a value of the information that is stored changes due to change over time. In such a case as well, it is desirable to be able to diagnose by such processing.

Twentieth Example

Applications to a system that detects a face will now be described.

First, the flow of the detection of the face will be described. The flow of the detection of the face is performed in the order of (1) feature extraction, and (2) model generation. In (1) feature extraction, media data is provided to a column having a machine learning function.

First, an extraction of the outline is performed as a method for extracting the feature of the image data.

The overall image that is acquired is divided respectively into, for example, 40 by 40 to go into 40×40=1600 columns and is divided into the total amount of black and 8 vectors (0, 45, 90, 135, 180, 225, 270, 315, and 360 degrees) of the outline.

In (2) model generation, the hash function for grasping the many features is embedded in the circuit from the start; and the hash function that extracts patterns such as similarity, regularity, etc., from the image data that is input is embedded and stored as the feature model. Subsequently, a comparison of the data to the correct set is performed; and the correction (learning) of the determination model is repeated to reduce the number of mis-identifications. By passing through the neuron cells for which the feature extraction and the model generation are performed, the data from a large amount of image data can be compared to each other to narrow down within a designated certainty (for example, 99.8%). Also, increased speed can be realized by parallel processing as necessary.

Twenty-First Example

An example in which non-structural data is analyzable by defining/making metadata will now be described.

A category may be made for whether or not the various activities of an organization or human cause things in one of the categories of a large amount of non-structured data such as documents, voices, images, and images to be utilized frequently even directly after the data generation. It is more favorable for the likelihood of being used frequently to be set as one item of the category classifications. To this end, it is important to perform learning from the outside. Thereby, a neuron learning type integrated circuit device can be provided in which people can cooperate together for learning and nurturing.

Specific examples of the classification items are shown below.

Basic information such as the type, size, creation date, owner, access permission, etc., of a file.

Information such as birthplace (hospital, photographs taken by a personal mobile telephone, landscape), medical chart, etc.

Further, whether or not the information is from the 5 senses (eyes, mouth, nose, ears, heart, . . . ) of a human.

Various information (patient name, ID, age, . . . , and physician's clinical comment) included in the electronic medical chart data and/or the medical image data, etc.

There is technology for designating object regions such as people's faces, cars, etc., from an image that is called object detection technology. Within such technology, the face detection function is already embedded and employed in imaging devices such as digital cameras, etc., and therefore can be used as beneficial knowledge information assets by storing and distributing the correct learning data. Further, acceleration can be made to process the correct judgments at higher speeds by being able to download the information that has been thus learned and install the information in the neuron semiconductor integrated circuit.

For example, it becomes possible to instantaneously correctly search for Mr. A in a sports arena faster than a person can. To this end, the search precision can be increased further by embedding API, etc., that also can use learning to perform processing by the learning of data having poor image quality by acquiring data of the person that was taken in the past from the Web or any computer.

Twenty-Second Example

Multilayer interconnects (TSV and optical communication) and inter-neuron interconnects will now be described. Recently, FPGAs (optical interconnect FPGAs), etc., that include optical connections are beginning to appear. Also, it is considered that the network environment will be an age of cloud computing and communication systems having wide bandwidths of 100 gigabits/second or more. Also, Flash_F-PGAs are being developed; and it is desirable for the interfaces to be embedded such that these LSIs can be connected as-is. In the neuron learning type integrated circuit device according to the example, it is important for implementation functions also for cooperating with such peripheral circuits to be embedded.

Twenty-Third Example

An example of a neuron cell unit including neurons will now be described.

For example, the example includes 8 synapse circuits and has a configuration in which the synapse circuits are in a state of being disposed at uniform spacing in a lattice configuration in substantially the entire surface inside the chip. The neuron cell unit is configured in an equivalent circuit of 8 input terminals+1 output terminal.

Also, the neuron cell unit has 2 types of the voltage lines VL and is made with a minimum configuration of 2 groups of three neurons in which three neurons form one set.

Twenty-Fourth Example

The relationship to the "column" illustrated as the hierarchical structure of the "neuron cell" which is the basis will now be described.

The column is separated into the following 6 layers of neuron cells 1 to n (cell-1 to cell-n) groups.
Neuron cell 1:
Neuron cell 2:
Neuron cell 3:
Neuron cell 4:
Neuron cell 5:
Neuron cell 6:

The "intra-neuron cell interconnect list 1" is defined for the neuron cells 1 to 6 for which the levels are divided as recited above. The IP-ization of the neuron cells and the connection definition of the interconnect circuit between the neuron cells are set in the intra-neuron cell interconnect list 1. (hierarchical level 1: cell-1 to cell-n connection)

Twenty-Fifth Example

To connect between multiple chips in which neuron circuits are configured, it is sufficient to connect to the chip of the upper side via an interconnect provided in the upper portion of the chip of the lower side. Specifically, an interconnect circuit is included between the chips above and below.

In the embodiments and the examples, an electronic circuit that is exactly equivalent to a threshold learning type neuron model can be realized using a simple circuit configuration. Also, the interconnect of a super large-scale threshold learning type neural network inside the chip in which a million or more neuron cells are integrated can be modified easily by adhering a conductive film sheet on which an inter-neuron interconnect is generated. Also, even in the case where an electrical interconnect that pierces between the chips is necessary, the interconnect modification can be realized easily using TSV, etc.

Twenty-Sixth Example

Further, an enormous neuron network can be increased unrestrictedly as necessary by rapidly stacking and unstacking the neuron chips.

Twenty-Seventh Example

Further, extension of the neuron network can be implemented unrestrictedly and easily not only by stacking but also by transforming the conductive film sheet to not only the neuron chip plane but to multiple plane surfaces; a neuron integrated circuit can be made that is compact, does not take up much surface area on the plane, and can be bent when extending by arranging the neuron chips in the plane or even when extending (upward, downward, leftward, and rightward: peripherally) in a plane by adjusting the connection spacing between the neuron chips; and it is possible also to cool each neuron chip as necessary for defects caused by heat.

According to the embodiments described above, it is possible to realize a huge neuron network that as an entirety imitates the nervous system of a human using a simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A neuron learning type integrated circuit device, comprising:
a plurality of neuron cell units, each of the plurality of neuron cell units including
a plurality of synapse circuit units, and
a soma circuit unit connected to the plurality of synapse circuit units,
each of the plurality of synapse circuit units including
a first transistor including a first terminal, a second terminal, and a first control terminal, the first terminal being connected to one of a plurality of voltage lines, the first transistor being normally-on,
a second transistor including a third terminal, a fourth terminal, and a second control terminal, the second terminal being connected to the third terminal, the second transistor being normally-off,
a first condenser, one end of the first condenser being connected between the second terminal and the third terminal, and
a control line connected to the first control terminal and the second control terminal,
the soma circuit unit including
a Zener diode including an input terminal and an output terminal, the input terminal being connected to the fourth terminal, and
a second condenser, one end of the second condenser being connected between the fourth terminal and the input terminal.

2. The neuron learning type integrated circuit device according to claim 1, wherein the level of a signal output from the output terminal is determined according to the difference between a total charge amount storable in the second condenser and an amount of charge stored in the second condenser.

3. The neuron learning type integrated circuit device according to claim 1, further comprising a delay circuit unit provided between the second terminal and the third terminal, the delay circuit unit being configured to set a time of the first transistor and the second transistor being simultaneously OFF when switching a signal input to the control line ON and OFF.

4. The neuron learning type integrated circuit device according to claim 1, wherein
the plurality of neuron cell units includes a first neuron cell unit and a second neuron cell unit, the first neuron cell unit being one of the plurality of neuron cell units, the second neuron cell unit being one other of the plurality of neuron cell units, and
the output terminal included in the first neuron cell unit is connected to the first control terminal included in one synapse circuit of the plurality of synapse circuits of the second neuron cell unit.

5. The neuron learning type integrated circuit device according to claim 1, including a plurality of neuron column units interconnected to each other,
the neuron column unit including a plurality of neuron block units,
the neuron block unit including the plurality of neuron cell units.

6. The neuron learning type integrated circuit device according to claim 1, further comprising a hash unit, the hash unit being configured to output a hash value based on a hash key and a signal, the signal being input to the control line of each of the plurality of synapse circuits.

7. A neuron learning type integrated circuit device, comprising:
a semiconductor substrate including a first semiconductor region of a first conductivity type and a second semiconductor region of a second conductivity type, the second semiconductor region being arranged with the first semiconductor region; and
a plurality of neuron cell units provided on the semiconductor substrate,
each of the plurality of neuron cell units including
a plurality of synapse circuit units, and
a soma circuit unit connected to the plurality of synapse circuit units,
each of the plurality of synapse circuit units including
a first transistor provided in the second semiconductor region, the first transistor including a first electrode, a second electrode, and a first control electrode, the first electrode being connected to one of a plurality of voltage lines, the first transistor being normally-on,
a second transistor provided in the first semiconductor region, the second transistor including a third electrode, a fourth electrode, and a second control electrode, the third electrode being connected to the second electrode, the second transistor being normally-off,
a first condenser provided between the first semiconductor region and the second semiconductor region, one end of the first condenser being connected between the second electrode and the third electrode, and
a control line connected to the first control electrode and the second control electrode,
the soma circuit unit including
a Zener diode including an input interconnect and an output interconnect, the input interconnect being connected to the fourth electrode, and
a second condenser, one end of the second condenser being connected between the fourth electrode and the input interconnect.

8. The neuron learning type integrated circuit device according to claim 7, wherein the second condenser includes:
a first plate electrode provided on a first layer, the first transistor and the second transistor being provided in the first layer; and
a second plate electrode provided parallel to the first plate electrode to be separated from the first plate electrode.

9. The neuron learning type integrated circuit device according to claim 8, wherein the second condenser further includes a floating conductive film provided between the first plate electrode and the second plate electrode.

10. The neuron learning type integrated circuit device according to claim 9, wherein the second plate electrode has an opening provided in a portion of a region where the second plate electrode and the floating conductive film overlap.

11. The neuron learning type integrated circuit device according to claim 7, further comprising a delay circuit unit arranged with the first transistor and the second transistor on the semiconductor substrate, the delay circuit unit being configured to set a time of the first transistor and the second transistor being simultaneously OFF when switching a signal input to the control line ON and OFF.

12. The neuron learning type integrated circuit device according to claim 7, comprising a first neuron cell unit and a second neuron cell unit, the first neuron cell unit being one of the plurality of neuron cell units, the second neuron cell unit being one other of the plurality of neuron cell units, the output interconnect included in the first neuron cell unit being connected to the first control electrode included in one synapse circuit of the plurality of synapse circuits of the second neuron cell unit.

13. The neuron learning type integrated circuit device according to claim 7, comprising a first stacked body layer and a second stacked body layer, the first stacked body layer being provided on the semiconductor substrate, the second stacked body layer being provided on the first stacked body layer, the plurality of neuron cell units being provided in the first stacked body layer, and the plurality of neuron cell units being provided in the second stacked body layer.

14. The neuron learning type integrated circuit device according to claim 13, further comprising a conductive interconnect layer provided between the first stacked body layer and the second stacked body layer to provide conduction between the neuron cell units included in the first stacked body layer and the neuron cell units included in the second stacked body layer.

15. The neuron learning type integrated circuit device according to claim 7, comprising a first stacked body layer and a second stacked body layer, the first stacked body layer being provided on a first surface of the semiconductor substrate, the second stacked body layer being provided on a second surface of the semiconductor substrate on a side opposite to the first surface, the plurality of neuron cell units being provided in the first stacked body layer, and the plurality of neuron cell units being provided in the second stacked body layer, a via interconnect being provided in the semiconductor substrate to provide conduction between the plurality of neuron cell units included in the first stacked body layer and the plurality of neuron cell units included in the second stacked body layer.

* * * * *